United States Patent
Lin et al.

(10) Patent No.: US 10,062,337 B2
(45) Date of Patent: Aug. 28, 2018

(54) ELECTROPHORETIC DISPLAY DEVICE

(71) Applicant: E Ink California, LLC., Fremont, CA (US)

(72) Inventors: Craig Lin, Oakland, CA (US); Bryan Hans Chan, San Francisco, CA (US); Hui Du, Milpitas, CA (US)

(73) Assignee: E INK CALIFORNIA, LLC, Fremont, CA (US)

( * ) Notice: Subject to any disclaimer, the term of this patent is extended or adjusted under 35 U.S.C. 154(b) by 0 days.

(21) Appl. No.: 15/290,022

(22) Filed: Oct. 11, 2016

(65) Prior Publication Data
US 2017/0103709 A1     Apr. 13, 2017

Related U.S. Application Data

(60) Provisional application No. 62/240,407, filed on Oct. 12, 2015.

(51) Int. Cl.
*G09G 3/34* (2006.01)
*G02F 1/167* (2006.01)

(52) U.S. Cl.
CPC ............. *G09G 3/344* (2013.01); *G02F 1/167* (2013.01); *G02F 2001/1678* (2013.01); *G09G 2300/06* (2013.01)

(58) Field of Classification Search
CPC .... G09G 3/344; G09G 2300/06; G02F 1/167; G02F 2001/1678
See application file for complete search history.

(56) References Cited

U.S. PATENT DOCUMENTS

| | | |
|---|---|---|
| 5,930,026 A | 7/1999 | Jacobson |
| 6,017,584 A | 1/2000 | Albert |
| 6,445,489 B1 | 9/2002 | Jacobson |
| 6,504,524 B1 | 1/2003 | Gates |
| 6,512,354 B2 | 1/2003 | Jacobson |
| 6,531,997 B1 | 3/2003 | Gates |
| 6,545,797 B2 | 4/2003 | Chen |
| 6,664,944 B1 | 12/2003 | Albert |
| 6,753,999 B2 | 6/2004 | Zehner, Jr. |
| 6,788,452 B2 | 9/2004 | Liang |
| 6,825,970 B2 | 11/2004 | Goenaga |
| 6,864,875 B2 | 3/2005 | Drzaic |
| 6,900,851 B2 | 5/2005 | Morrison |
| 6,914,714 B2 | 7/2005 | Chen |
| 6,930,818 B1 | 8/2005 | Liang |

(Continued)

FOREIGN PATENT DOCUMENTS

| | | |
|---|---|---|
| JP | 2009116041 A | 5/2009 |
| KR | 1020070082680 | 8/2007 |

OTHER PUBLICATIONS

PCT/US2016/056356, PCT Notification of Transmittal of the International Search Report and the Written Opinion of the International Searching Authority, or the Declatation, dated Jan. 23, 2017 Jan. 23, 2017.

*Primary Examiner* — Andrew Sasinowski
(74) *Attorney, Agent, or Firm* — Brian D. Bean

(57) ABSTRACT

An electrophoretic display is provided suitable for passive matrix driving. The electrophoretic display comprises three types of particles, with the first and second types of charged particles carrying charges of opposite polarities and have contrasting colors. The third type of particles has the same color as the first or the second type of particles.

16 Claims, 15 Drawing Sheets

(56) References Cited

U.S. PATENT DOCUMENTS

| | | |
|---|---|---|
| 6,972,893 B2 | 12/2005 | Sipix |
| 6,995,550 B2 | 2/2006 | Jacobson |
| 7,012,600 B2 | 3/2006 | Zehner |
| 7,023,420 B2 | 4/2006 | Comiskey et al. |
| 7,034,783 B2 | 4/2006 | Gates |
| 7,038,656 B2 | 5/2006 | Liang |
| 7,038,670 B2 | 5/2006 | Liang |
| 7,046,228 B2 | 5/2006 | Liang |
| 7,052,571 B2 | 5/2006 | Wang |
| 7,061,166 B2 | 6/2006 | Kuniyasu |
| 7,061,662 B2 | 6/2006 | Chung |
| 7,075,502 B1 | 7/2006 | Drzaic |
| 7,116,466 B2 | 10/2006 | Whitesides et al. |
| 7,119,772 B2 | 10/2006 | Amundson |
| 7,167,155 B1 | 1/2007 | Albert et al. |
| 7,177,066 B2 | 2/2007 | Chung |
| 7,193,625 B2 | 3/2007 | Danner et al. |
| 7,202,847 B2 | 4/2007 | Gates |
| 7,242,514 B2 | 7/2007 | Chung |
| 7,259,744 B2 | 8/2007 | Arango |
| 7,304,787 B2 | 12/2007 | Whitesides et al. |
| 7,312,794 B2 | 12/2007 | Zehner |
| 7,327,511 B2 | 2/2008 | Whitesides et al. |
| 7,385,751 B2 | 6/2008 | Chen |
| 7,408,699 B2 | 8/2008 | Wang |
| 7,453,445 B2 | 11/2008 | Amundson |
| 7,492,339 B2 | 2/2009 | Amundson |
| 7,492,505 B2 | 2/2009 | Liang |
| 7,528,822 B2 | 5/2009 | Amundson |
| 7,545,358 B2 | 6/2009 | Gates et al. |
| 7,583,251 B2 | 9/2009 | Arango |
| 7,602,374 B2 | 10/2009 | Zehner et al. |
| 7,612,760 B2 | 11/2009 | Kawai |
| 7,667,684 B2 | 2/2010 | Jacobson et al. |
| 7,679,599 B2 | 3/2010 | Kawai |
| 7,679,813 B2 | 3/2010 | Liang |
| 7,683,606 B2 | 3/2010 | Kang |
| 7,684,108 B2 | 3/2010 | Wang |
| 7,688,297 B2 | 3/2010 | Zehner et al. |
| 7,729,039 B2 | 6/2010 | LeCain et al. |
| 7,733,311 B2 | 6/2010 | Amundson |
| 7,733,335 B2 | 6/2010 | Zehner et al. |
| 7,787,169 B2 | 8/2010 | Abramson et al. |
| 7,791,789 B2 | 9/2010 | Albert |
| 7,800,813 B2 | 9/2010 | Wu |
| 7,821,702 B2 | 10/2010 | Liang |
| 7,839,564 B2 | 11/2010 | Whitesides et al. |
| 7,859,742 B1 | 12/2010 | Chiu |
| 7,910,175 B2 | 3/2011 | Webber |
| 7,952,557 B2 | 5/2011 | Amundson |
| 7,952,790 B2 | 5/2011 | Honeyman |
| 7,956,841 B2 | 6/2011 | Albert |
| 7,982,479 B2 | 7/2011 | Wang |
| 7,982,941 B2 | 7/2011 | Lin |
| 7,999,787 B2 | 8/2011 | Amundson |
| 8,040,594 B2 | 10/2011 | Paolini, Jr. |
| 8,054,526 B2 | 11/2011 | Bouchard |
| 8,077,141 B2 | 12/2011 | Duthaler |
| 8,098,418 B2 | 1/2012 | Paolini, Jr. |
| 8,115,729 B2 | 2/2012 | Danner |
| 8,125,501 B2 | 2/2012 | Amundson |
| 8,139,050 B2 | 3/2012 | Jacobson et al. |
| 8,159,636 B2 | 4/2012 | Sun |
| 8,174,490 B2 | 5/2012 | Whitesides |
| 8,213,076 B2 | 7/2012 | Albert |
| 8,243,013 B1 | 8/2012 | Sprague |
| 8,274,472 B1 | 9/2012 | Wang |
| 8,289,250 B2 | 10/2012 | Zehner |
| 8,300,006 B2 | 10/2012 | Zhou |
| 8,305,341 B2 | 11/2012 | Arango |
| 8,314,784 B2 | 11/2012 | Ohkami |
| 8,363,299 B2 | 1/2013 | Paolini, Jr. |
| 8,373,649 B2 | 2/2013 | Low |
| 8,384,658 B2 | 2/2013 | Albert |
| 8,422,116 B2 | 4/2013 | Sprague |
| 8,441,714 B2 | 5/2013 | Paolini, Jr. |
| 8,441,716 B2 | 5/2013 | Paolini, Jr. |
| 8,456,414 B2 | 6/2013 | Lin |
| 8,462,102 B2 | 6/2013 | Wong |
| 8,466,852 B2 | 6/2013 | Drzaic |
| 8,503,063 B2 | 8/2013 | Sprague |
| 8,514,168 B2 | 8/2013 | Chung |
| 8,537,105 B2 | 9/2013 | Chiu |
| 8,558,783 B2 | 10/2013 | Wilcox |
| 8,558,785 B2 | 10/2013 | Zehner |
| 8,558,786 B2 | 10/2013 | Lin |
| 8,558,855 B2 | 10/2013 | Sprague |
| 8,576,164 B2 | 11/2013 | Sprague |
| 8,576,259 B2 | 11/2013 | Lin |
| 8,576,470 B2 | 11/2013 | Paolini, Jr. |
| 8,576,475 B2 | 11/2013 | Huang |
| 8,593,396 B2 | 11/2013 | Amundson |
| 8,593,721 B2 | 11/2013 | Albert |
| 8,605,032 B2 | 12/2013 | Liu |
| 8,605,354 B2 | 12/2013 | Zhang |
| 8,643,595 B2 | 2/2014 | Chung |
| 8,649,084 B2 | 2/2014 | Wang |
| 8,665,206 B2 | 3/2014 | Lin |
| 8,670,174 B2 | 3/2014 | Sprague |
| 8,681,191 B2 | 3/2014 | Yang |
| 8,704,756 B2 | 4/2014 | Lin |
| 8,717,664 B2 | 5/2014 | Wang |
| 8,730,153 B2 | 5/2014 | Sprague |
| 8,786,935 B2 | 7/2014 | Sprague |
| 8,797,634 B2 | 8/2014 | Paolini, Jr. |
| 8,810,525 B2 | 8/2014 | Sprague |
| 8,810,899 B2 | 8/2014 | Sprague |
| 8,830,559 B2 | 9/2014 | Honeyman |
| 8,873,129 B2 | 10/2014 | Paolini, Jr. |
| 8,902,153 B2 | 12/2014 | Bouchard |
| 8,902,491 B2 | 12/2014 | Wang |
| 8,917,439 B2 | 12/2014 | Wang |
| 8,928,562 B2 | 1/2015 | Gates et al. |
| 8,928,641 B2 | 1/2015 | Chiu |
| 8,964,282 B2 | 2/2015 | Wang |
| 8,976,444 B2 | 3/2015 | Zhang |
| 9,013,394 B2 | 4/2015 | Lin |
| 9,013,783 B2 | 4/2015 | Sprague |
| 9,019,197 B2 | 4/2015 | Lin |
| 9,019,198 B2 | 4/2015 | Lin |
| 9,019,318 B2 | 4/2015 | Sprague |
| 9,082,352 B2 | 7/2015 | Cheng |
| 9,116,412 B2 | 8/2015 | Lin |
| 9,146,439 B2 | 9/2015 | Zhang |
| 9,164,207 B2 | 10/2015 | Honeyman et al. |
| 9,170,467 B2 | 10/2015 | Whitesides |
| 9,170,468 B2 | 10/2015 | Lin |
| 9,171,508 B2 | 10/2015 | Sprague |
| 9,182,646 B2 | 11/2015 | Paolini, Jr. |
| 9,195,111 B2 | 11/2015 | Anseth |
| 9,199,441 B2 | 12/2015 | Danner |
| 9,218,773 B2 | 12/2015 | Sun |
| 9,224,338 B2 | 12/2015 | Chan |
| 9,224,342 B2 | 12/2015 | Lin |
| 9,224,344 B2 | 12/2015 | Chung |
| 9,230,492 B2 | 1/2016 | Harrington |
| 9,251,736 B2 | 2/2016 | Lin |
| 9,262,973 B2 | 2/2016 | Wu |
| 9,268,191 B2 | 2/2016 | Paolini, Jr. |
| 9,269,311 B2 | 2/2016 | Amundson |
| 9,285,649 B2 | 3/2016 | Du |
| 9,293,511 B2 | 3/2016 | Jacobson |
| 9,299,294 B2 | 3/2016 | Lin |
| 9,341,916 B2 | 5/2016 | Telfer et al. |
| 9,360,733 B2 | 6/2016 | Wang |
| 9,361,836 B1 | 6/2016 | Telfer et al. |
| 9,373,289 B2 | 6/2016 | Sprague |
| 9,383,623 B2 | 7/2016 | Lin |
| 9,390,066 B2 | 7/2016 | Smith |
| 9,390,661 B2 | 7/2016 | Chiu |
| 9,412,314 B2 | 8/2016 | Amundson |
| 9,423,666 B2 | 8/2016 | Wang |
| 2003/0102858 A1 | 6/2003 | Jacobson et al. |
| 2004/0246562 A1 | 12/2004 | Chung |

(56) References Cited

U.S. PATENT DOCUMENTS

| | | |
|---|---|---|
| 2005/0253777 A1 | 11/2005 | Zehner et al. |
| 2007/0091418 A1 | 4/2007 | Danner et al. |
| 2007/0103427 A1 | 5/2007 | Zhou |
| 2007/0176912 A1 | 8/2007 | Beames |
| 2008/0024429 A1 | 1/2008 | Zehner |
| 2008/0024482 A1 | 1/2008 | Gates |
| 2008/0043318 A1 | 2/2008 | Whitesides |
| 2008/0048970 A1 | 2/2008 | Drzaic |
| 2008/0136774 A1 | 6/2008 | Harris |
| 2008/0291129 A1 | 11/2008 | Harris |
| 2008/0303780 A1 | 12/2008 | Sprague |
| 2009/0174651 A1 | 7/2009 | Jacobson |
| 2009/0195568 A1 | 8/2009 | Sjodin |
| 2009/0225398 A1 | 9/2009 | Duthaler |
| 2009/0322721 A1 | 12/2009 | Zehner |
| 2010/0156780 A1 | 6/2010 | Jacobson |
| 2010/0194733 A1 | 8/2010 | Lin |
| 2010/0194789 A1 | 8/2010 | Lin |
| 2010/0220121 A1 | 9/2010 | Zehner |
| 2010/0225997 A1 * | 9/2010 | Yamamoto ............... G02F 1/167 359/296 |
| 2010/0265561 A1 | 10/2010 | Gates et al. |
| 2010/0283804 A1 | 11/2010 | Sprague |
| 2011/0043543 A1 | 2/2011 | Chen |
| 2011/0063314 A1 | 3/2011 | Chiu |
| 2011/0175875 A1 | 7/2011 | Lin |
| 2011/0193840 A1 | 8/2011 | Amundson |
| 2011/0193841 A1 | 8/2011 | Amundson |
| 2011/0199671 A1 | 8/2011 | Amundson |
| 2011/0221740 A1 | 9/2011 | Yang |
| 2012/0001957 A1 | 1/2012 | Liu |
| 2012/0098740 A1 | 4/2012 | Chiu |
| 2012/0326957 A1 | 12/2012 | Drzaic |
| 2013/0063333 A1 | 3/2013 | Arango |
| 2013/0194250 A1 | 8/2013 | Amundson |
| 2013/0242378 A1 | 9/2013 | Paolini, Jr. |
| 2013/0249782 A1 | 9/2013 | Wu |
| 2013/0278995 A1 | 10/2013 | Drzaic |
| 2013/0321278 A1 | 12/2013 | Sjodin et al. |
| 2014/0009817 A1 | 1/2014 | Wilcox et al. |
| 2014/0011913 A1 | 1/2014 | Du |
| 2014/0055840 A1 | 2/2014 | Zang |
| 2014/0078576 A1 | 3/2014 | Sprague |
| 2014/0085355 A1 | 3/2014 | Chang |
| 2014/0204012 A1 | 7/2014 | Wu |
| 2014/0218277 A1 | 8/2014 | Cheng |
| 2014/0240210 A1 | 8/2014 | Wu |
| 2014/0240373 A1 | 8/2014 | Harrington |
| 2014/0253425 A1 | 9/2014 | Zalesky |
| 2014/0292830 A1 | 10/2014 | Harrington et al. |
| 2014/0293398 A1 | 10/2014 | Wang |
| 2014/0333685 A1 | 11/2014 | Sim |
| 2014/0340430 A1 | 11/2014 | Telfer |
| 2014/0340734 A1 | 11/2014 | Lin |
| 2014/0340736 A1 | 11/2014 | Lin |
| 2014/0347407 A1 * | 11/2014 | Wang ..................... G02F 1/167 345/690 |
| 2014/0362213 A1 | 12/2014 | Tseng |
| 2015/0070744 A1 | 3/2015 | Danner et al. |
| 2015/0097877 A1 * | 4/2015 | Lin ........................ G09G 3/344 345/691 |
| 2015/0103394 A1 | 4/2015 | Wang |
| 2015/0109283 A1 | 4/2015 | Gates |
| 2015/0118390 A1 | 4/2015 | Rosenfeld |
| 2015/0124345 A1 | 5/2015 | Rosenfeld |
| 2015/0198858 A1 | 7/2015 | Chan |
| 2015/0213749 A1 | 7/2015 | Lin |
| 2015/0213765 A1 | 7/2015 | Gates |
| 2015/0221257 A1 | 8/2015 | Wilcox et al. |
| 2015/0234250 A1 | 8/2015 | Lin |
| 2015/0262255 A1 | 9/2015 | Khajehnouri |
| 2015/0262551 A1 | 9/2015 | Zehner |
| 2015/0268531 A1 | 9/2015 | Wang |
| 2015/0301246 A1 | 10/2015 | Zang |
| 2016/0011484 A1 | 1/2016 | Chan |
| 2016/0026062 A1 | 1/2016 | Zhang |
| 2016/0048054 A1 | 2/2016 | Danner |
| 2016/0071465 A1 | 3/2016 | Hung |
| 2016/0078820 A1 | 3/2016 | Harrington |
| 2016/0093253 A1 | 3/2016 | Yang |
| 2016/0116816 A1 | 4/2016 | Paolini |
| 2016/0116818 A1 | 4/2016 | Du |
| 2016/0140909 A1 | 5/2016 | Lin |
| 2016/0140910 A1 | 5/2016 | Amundson |
| 2016/0180777 A1 | 6/2016 | Lin |
| 2016/0260372 A1 | 9/2016 | Wang |
| 2016/0293111 A1 | 10/2016 | Lin |

* cited by examiner

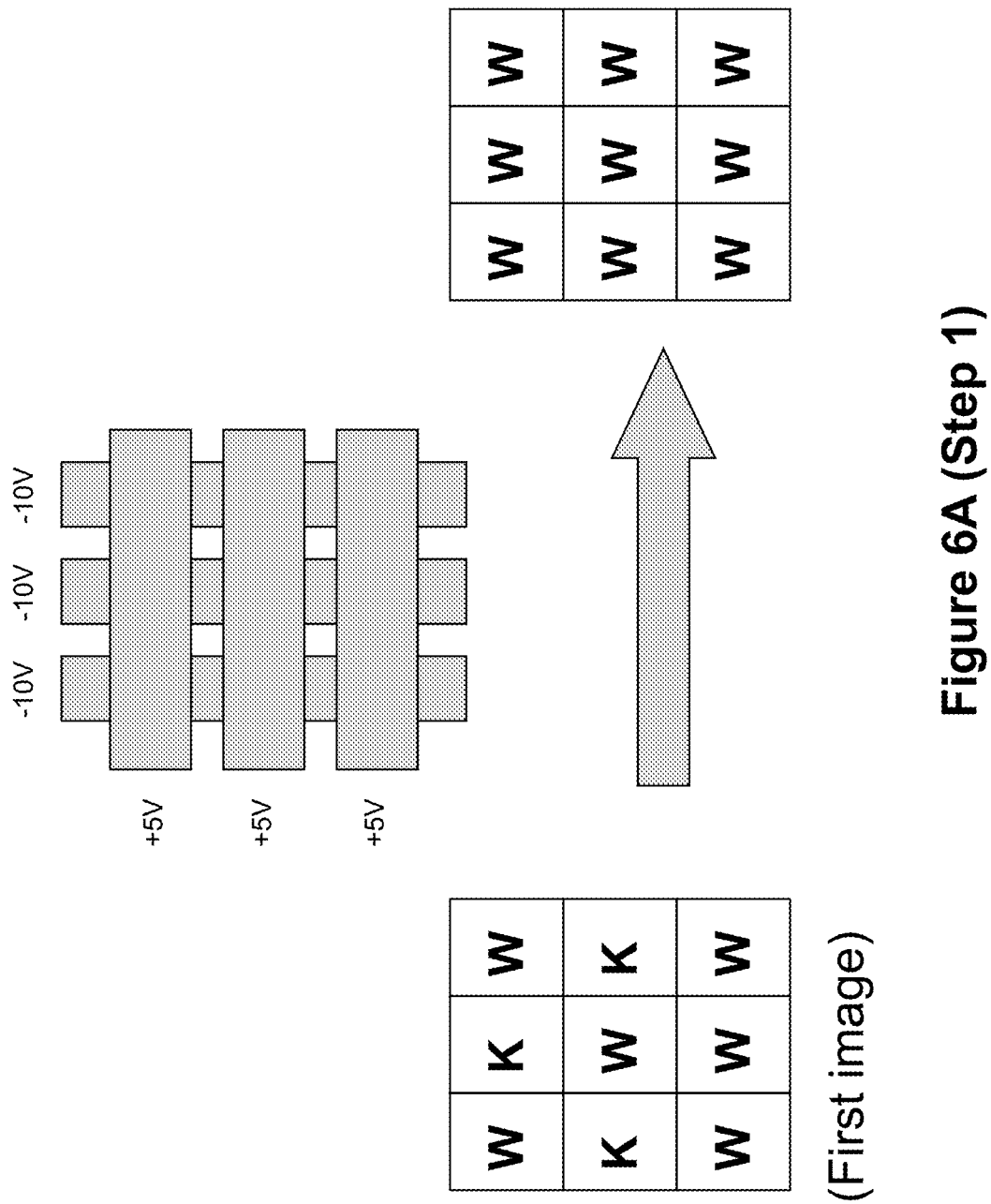
Figure 6A (Step 1)

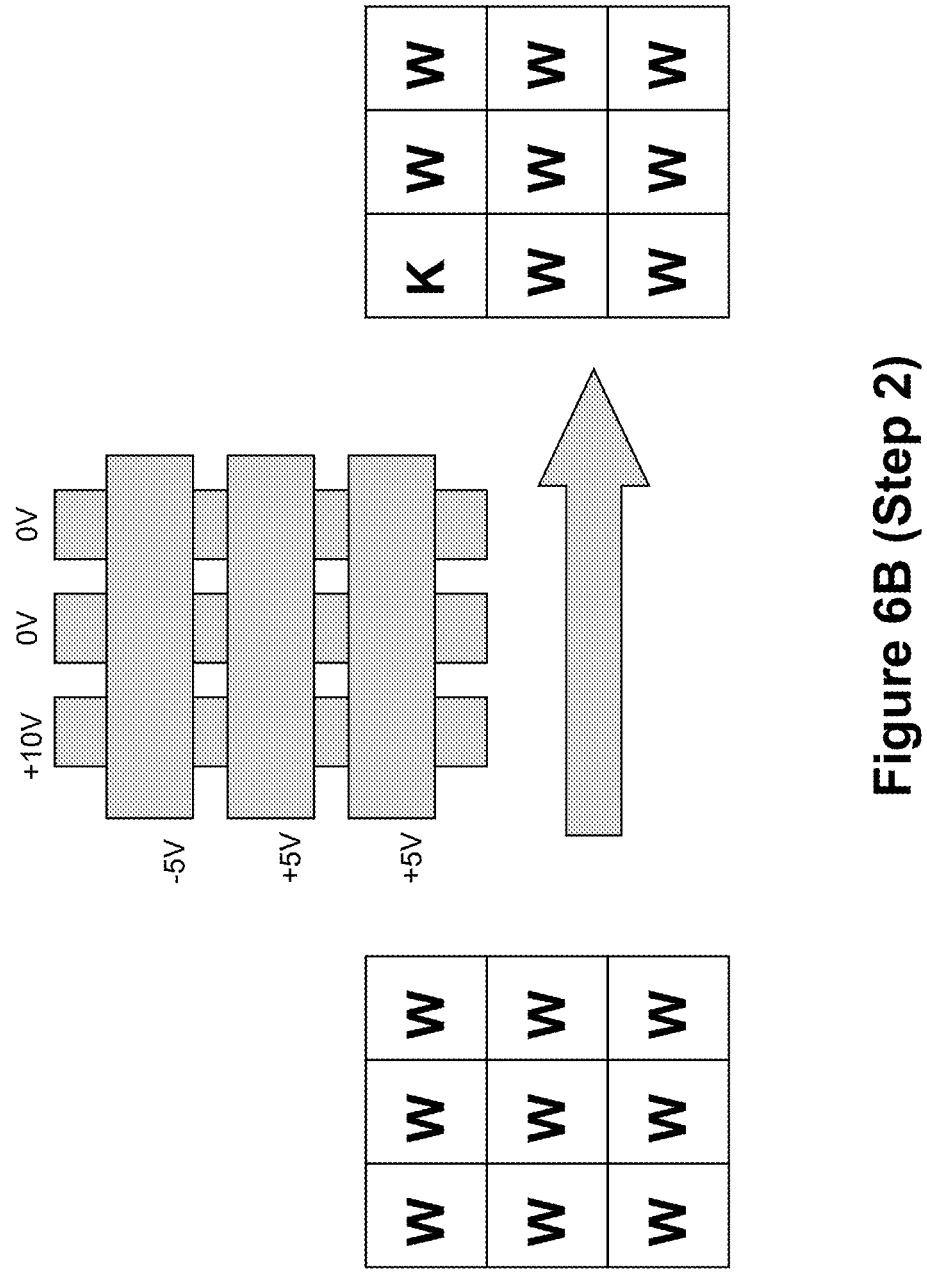
Figure 6B (Step 2)

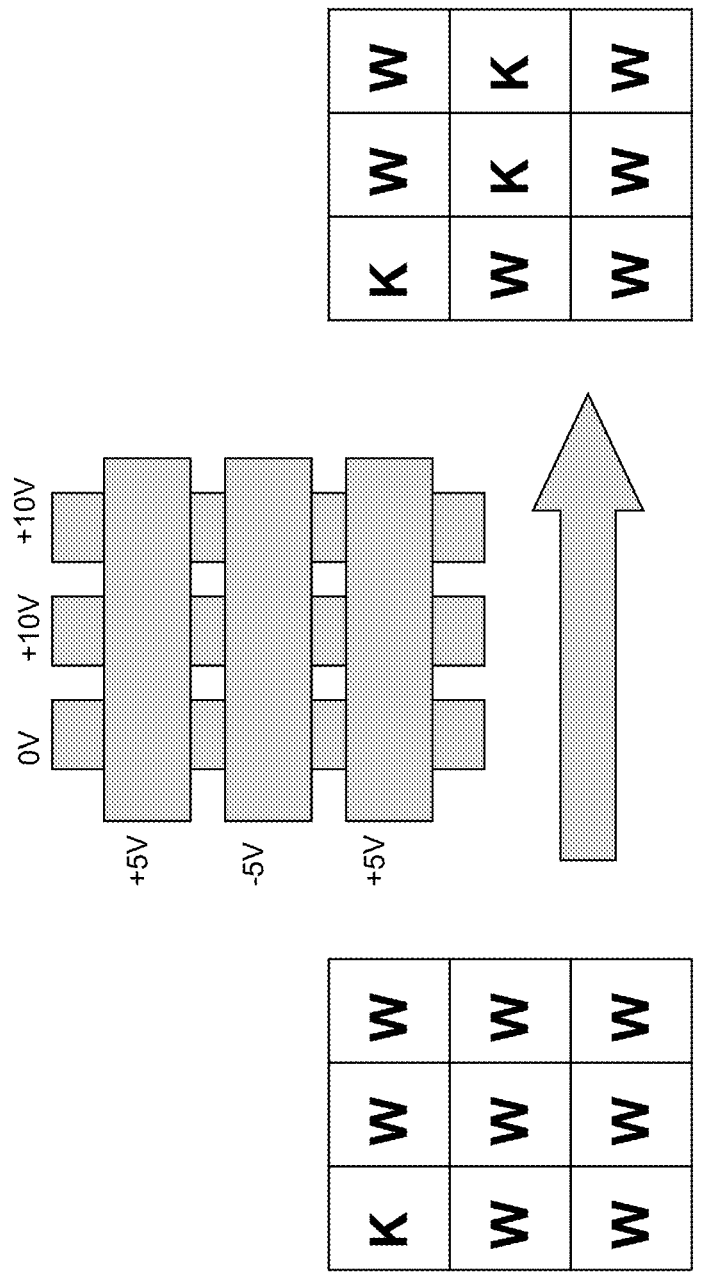
Figure 6C (Step 3)

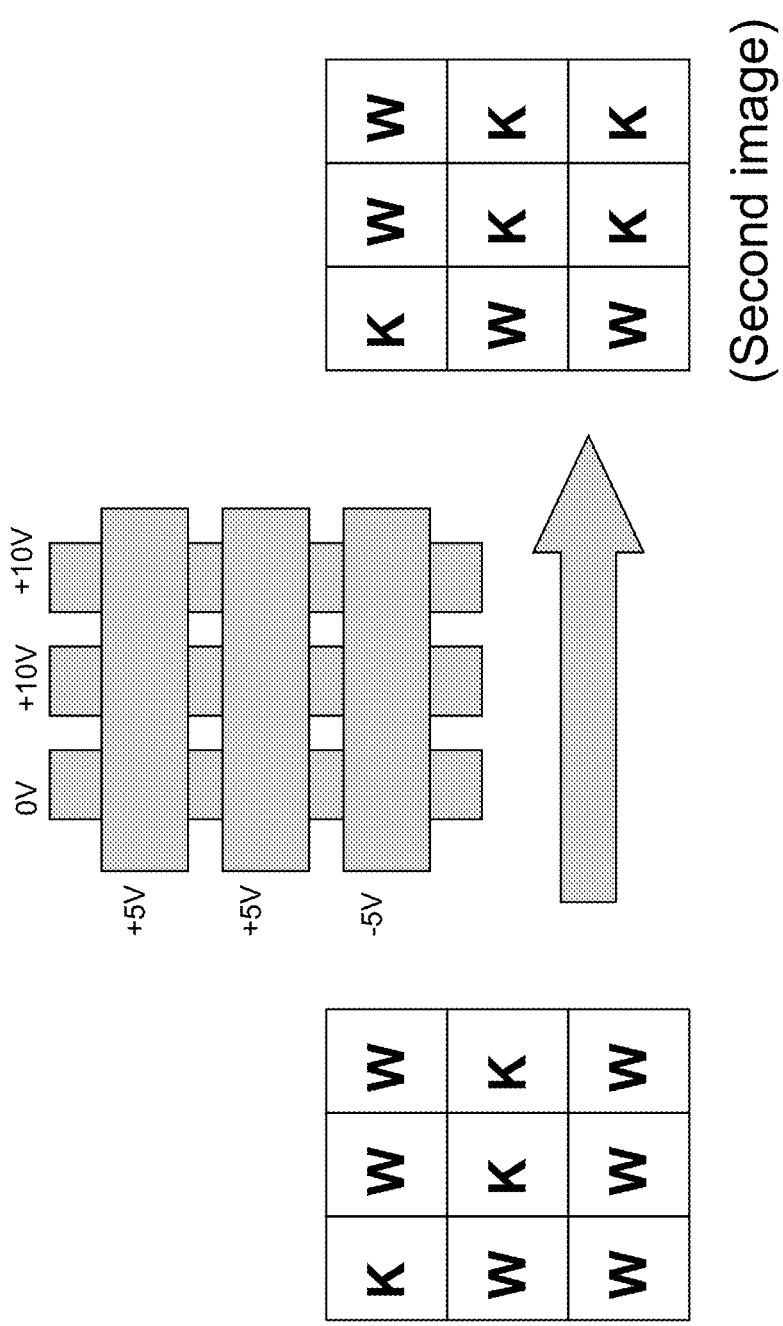
Figure 6D (Step 4)

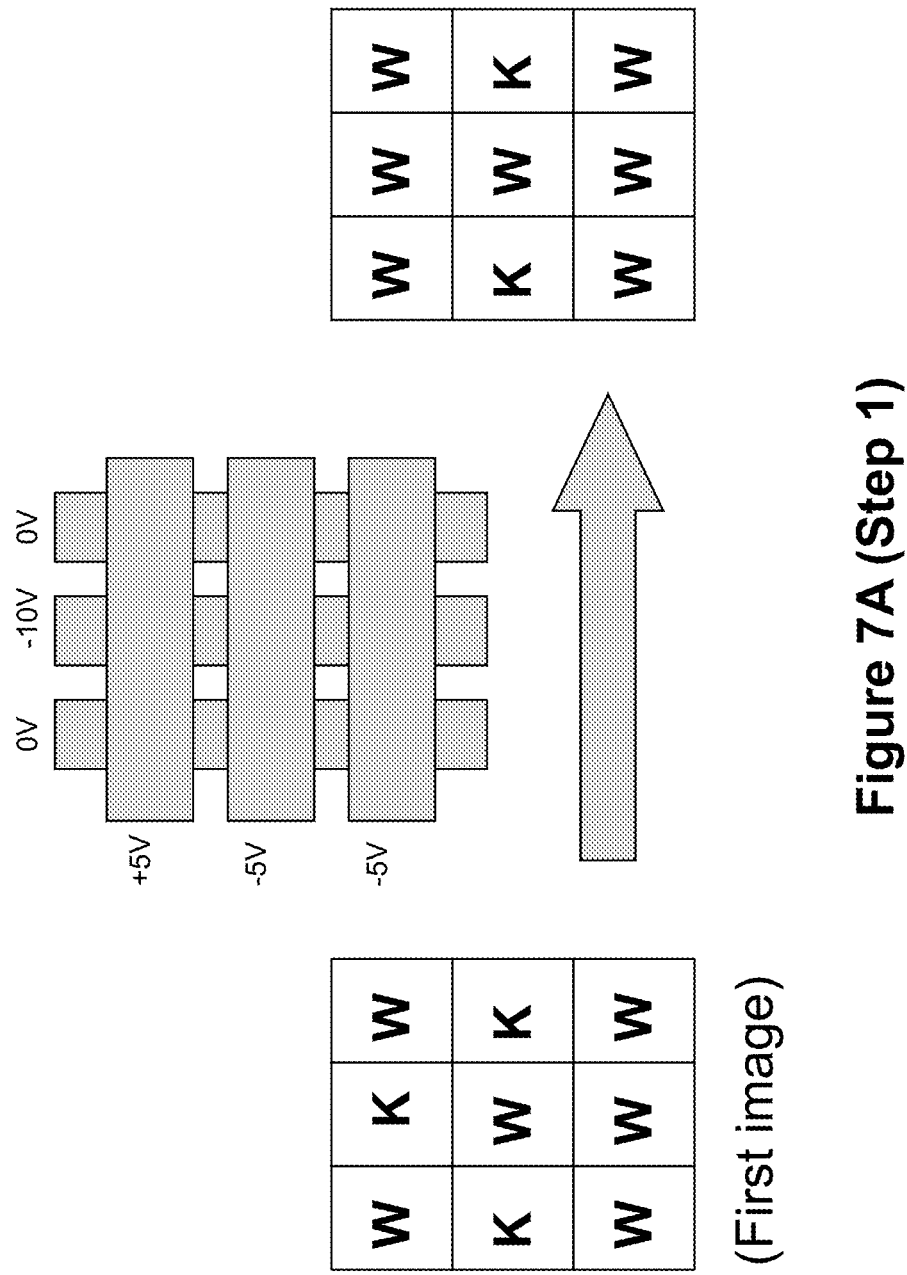

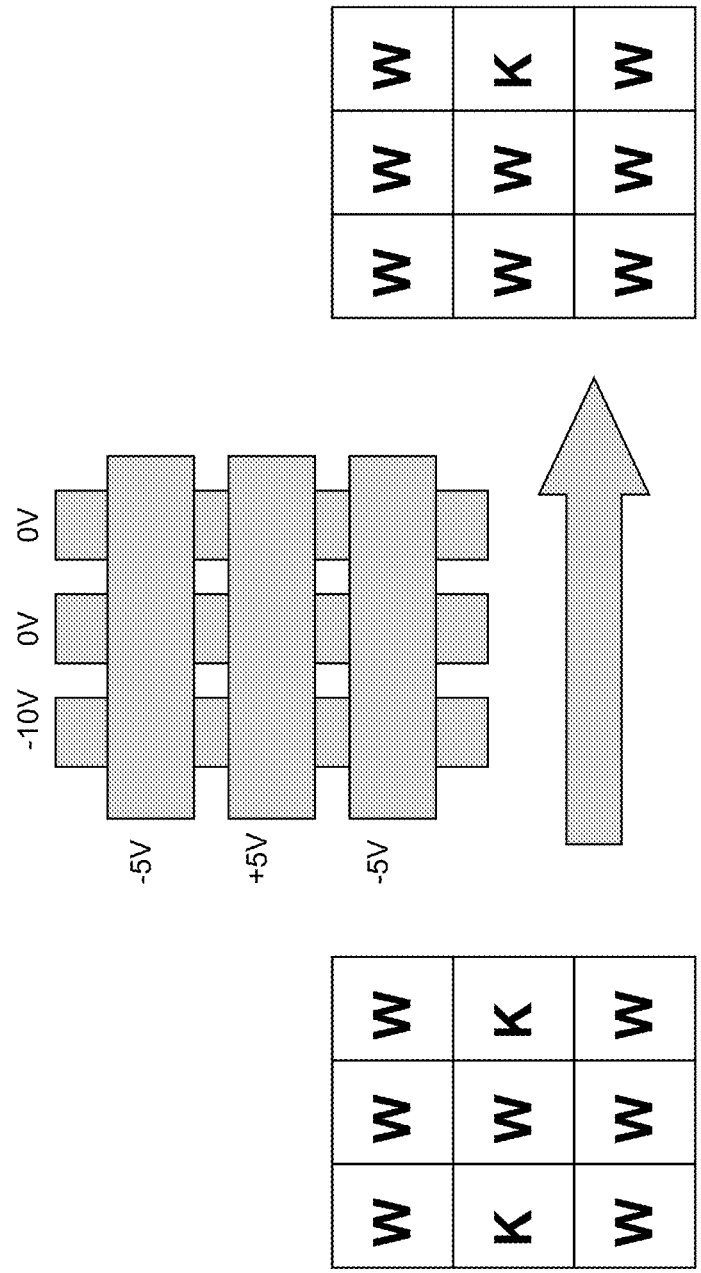
Figure 7B (Step 2)

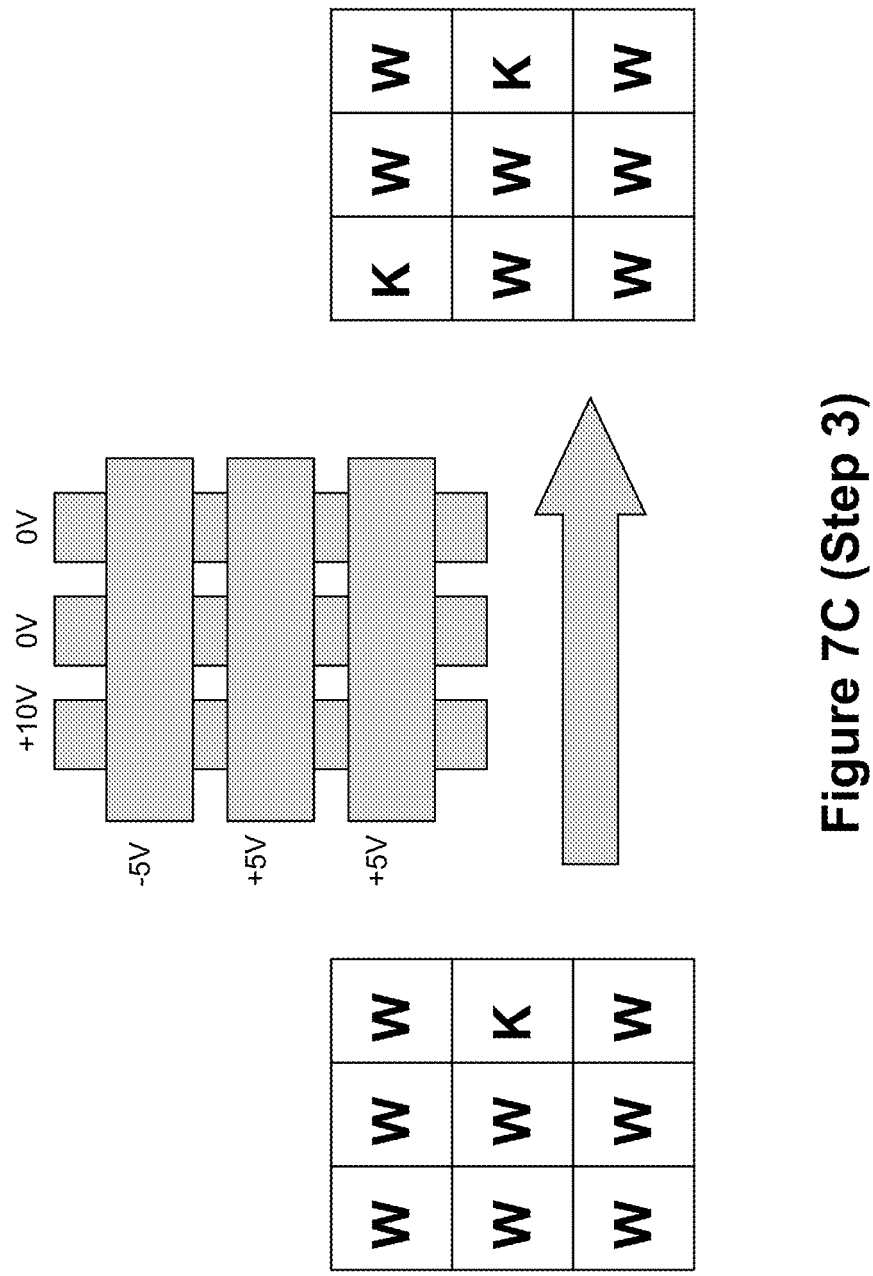
Figure 7C (Step 3)

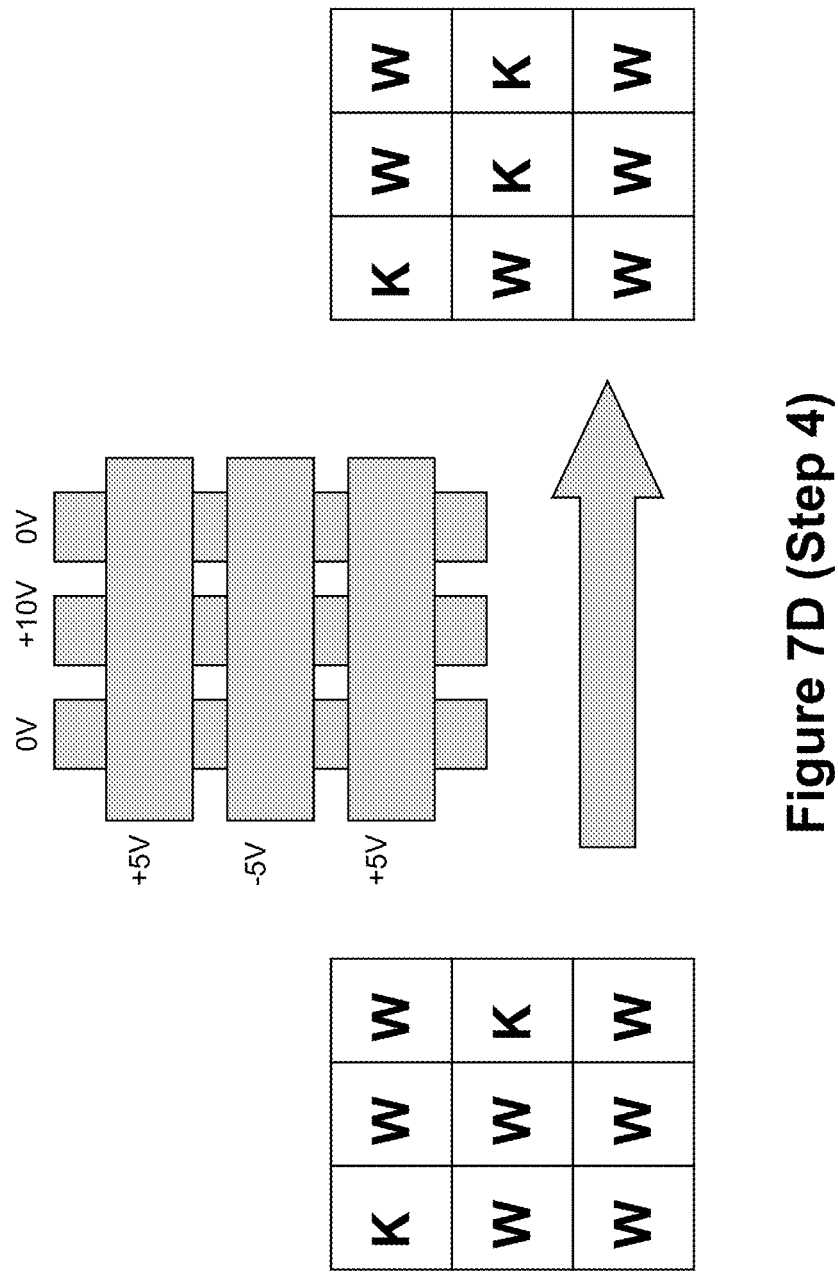

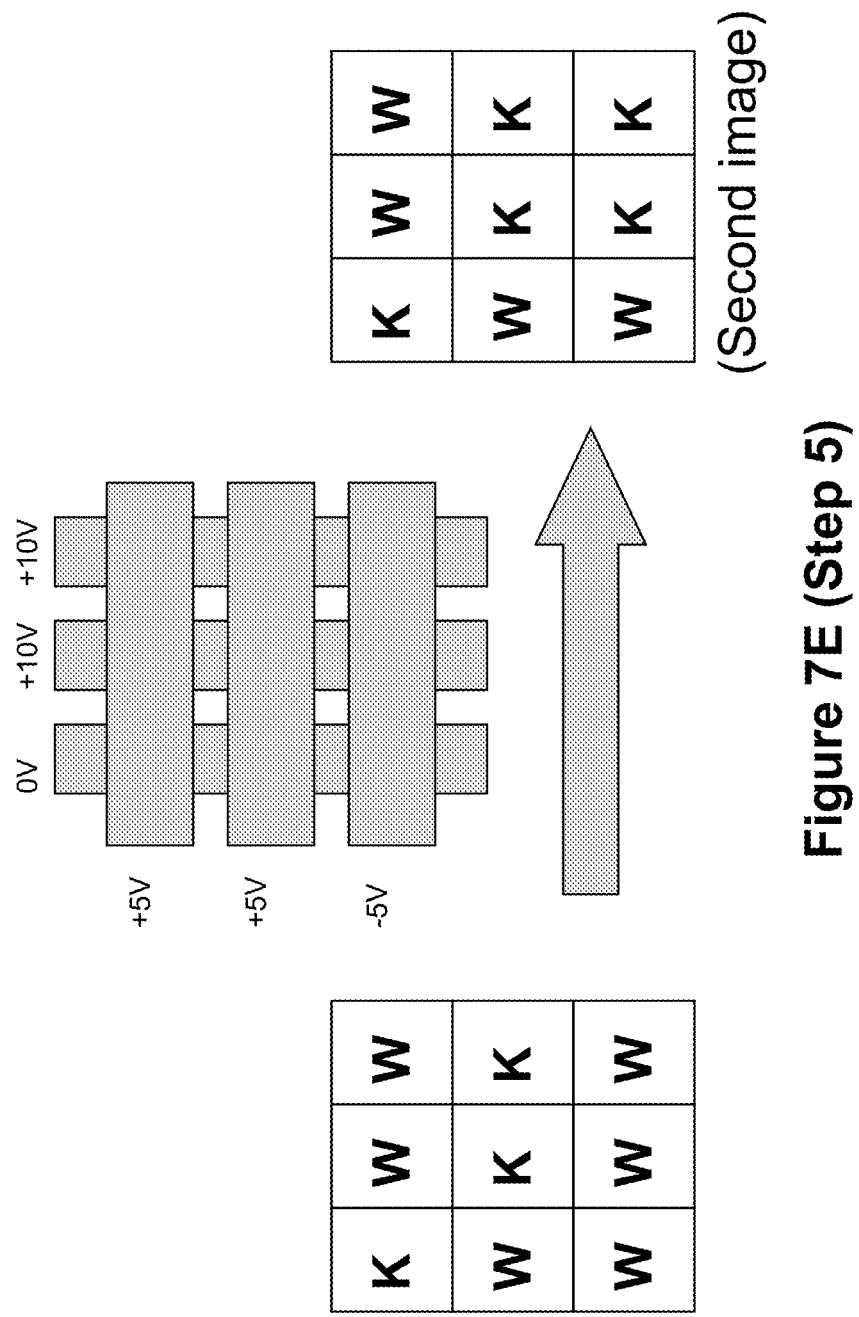

ELECTROPHORETIC DISPLAY DEVICE

REFERENCE TO RELATED APPLICATIONS

This application claims benefit of Application Ser. No. 62/240,407, filed Oct. 12, 2015.

This application is also related to:
(a) U.S. Pat. Nos. 8,717,664; 8,964,282; and 9,360,733; and U.S. Patent Publication No. 2016/0260372;
(b) U.S. Patent Publication No. 2015/0103394;
(c) U.S. Patent Publication No. 2015/0097877; and
(d) U.S. Patent Publication No. 2016/0293111

The entire contents of these patents and copending applications, and of all other U.S. patents and published and copending applications mentioned below, are herein incorporated by reference.

BACKGROUND OF INVENTION

This invention relates to electrophoretic displays, methods for driving such displays and electrophoretic media for use in such displays.

The electrophoretic display (EPD) is a non-emissive device based on the electrophoresis phenomenon of charged pigment particles dispersed in a solvent. The display typically comprises two plates with electrodes placed opposing each other. One of the electrodes is usually transparent. An electrophoretic medium composed of a colored fluid with charged pigment particles dispersed therein is enclosed between the two plates. When a voltage difference is imposed between the two electrodes, the pigment particles migrate to one side or the other causing either the color of the pigment particles or the color of the fluid being seen from the viewing side.

Alternatively, an electrophoretic medium may comprise two (or more) types of charged pigment particles of contrasting colors and carrying opposite charges, and the two types of the charged pigment particles are dispersed in a clear fluid. In this case, when a voltage difference is imposed between the two electrode plates, the two types of the charged pigment particles would move to opposite sides. Thus one of the colors of the two types of the charged pigment particles would be seen at the viewing side.

The aforementioned patents and published applications describe an electrophoretic medium containing three types of particles, typically all having differing optical characteristics. (Although the optical characteristic is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.) The first and second types of particles carry charges of opposite polarities. The third type of particles carries a charge of the same polarity as the second type of particles but has a lower zeta potential and/or electrophoretic mobility than the first or second types of particles. By careful control of the magnitude and sequencing of the electric fields applied to such an electrophoretic medium, the optical characteristics of the three types of particles can be displayed at a viewing surface of a display. As illustrated for example in FIG. 2 of the aforementioned U.S. Pat. No. 8,717,664, the optical characteristics of the first and second types of particles are displayed by applying high electric fields of the appropriate polarity to the electrophoretic medium in essentially the same way as in the two particle media discussed in the preceding paragraph. To display the optical characteristic of the third type of particles, one first drives the medium to display the optical characteristic of the first type of particles (i.e., the particles bearing a charge of the opposite polarity to the third type of particles) and then applies a low electric field of a polarity which tends to drive the third type of particles towards the viewing surface. This low electric field causes the first type of particles to move away from the viewing surface and the second and third type of particles to move towards the viewing surface. However, it appears (although the present invention is in no way limited by this belief) that the highly charged first and second types of particles aggregate with each other, so that only the third type of particles are driven adjacent the viewing surface, so that the optical characteristic of the third type of particles is displayed.

One problem with conventional electrophoretic media is that they cannot be driven using passive matrix driving methods (in which an electric field is applied by means of a first set of elongate electrodes disposed on one side of the electrophoretic medium and a second set of elongate electrodes are disposed on the opposed side of the electrophoretic medium, the first and second sets of elongate electrodes being arranged with their long axes at an angle to each other so that a plurality of pixels are formed, each pixel being defined by the overlap of one electrode of the first set with one electrode of the second set). Passive matrix driving methods require that the electrophoretic medium have a substantial threshold voltage (i.e., a voltage which can be applied across the medium for a prolonged period without causing any change in the optical state displayed) and most conventional electrophoretic media have no threshold voltage or only a minimal one. It has now been discovered that a subset of the three particle electrophoretic media described in the aforementioned patents and published applications can be driven by passive matrix driving methods, and the present invention relates to such media, electrophoretic displays incorporating such media, and driving methods for use in such electrophoretic displays.

SUMMARY OF INVENTION

Accordingly, in one aspect this invention provides an electrophoretic display having a viewing surface and comprising an electrophoretic medium and means for applying an electric field to the electrophoretic medium, the electrophoretic medium comprising a fluid and first, second and third types of particles dispersed in the fluid, wherein:
(i) the first and second types of particles bear charges of opposite polarities and have first and second optical characteristics differing from each other;
(ii) the third type of particles has substantially the first optical characteristic and bears a charge of the same polarity as the second type of particles but have a lower zeta potential or electrophoretic mobility than the second type of particles; and
(iii) when the first optical characteristic is displayed at the viewing surface, application for a time T of an electric field E of a polarity which drives the second type of particles towards the viewing surface will cause the second optical characteristic to be displayed at the viewing surface, but application for a time T of an electric field E/3 of the same polarity will cause the first optical characteristic to remain displayed at the viewing surface.

In this electrophoretic display of the present invention, the first and second optical characteristics may be differing colors, such as white and black colors. In a first embodiment of the electrophoretic display, the first type of particles is white and negatively charged, the second type of particles is black and positively charged, and the third type of particles is white and positively charged. In a second embodiment, the first type of particles is black and positively charged, the second type of particles is white and negatively charged, the third type of particles is black and negatively charged. In a third embodiment, the first type of particles is white and positively charged, the second type of particles is black and negatively charged, and the third type of particles is white and negatively charged. In a fourth embodiment, the first type of particles is black and negatively charged, the second type of particles is white and positively charged, and the third type of particles is black and positively charged.

In the electrophoretic display of the present invention, the third type of particles may have a larger average size than the first and second types of particles; for example, the third type of particles may be about 2 to about 50 times the size of the first or second types of particles. The means for applying an electric field may comprise a first set of elongate electrodes disposed adjacent the viewing surface and a second set of elongate electrodes disposed on the opposed side of the electrophoretic medium from the viewing surface, the first and second sets of elongate electrodes being arranged with their long axes at an angle to each other so that a plurality of pixels are formed, each pixel being defined by the overlap of one electrode of the first set with one electrode of the second set, thereby forming a passive matrix driving system.

In another aspect, this invention provides a (first or "via first") method for driving a display of the present invention, the display having a plurality of pixels, each capable of displaying either the first or the second optical characteristic at the viewing surface, from a first image to a second image. This method comprises:
(i) driving all pixels of the display to display the first optical characteristic; and
(ii) driving the pixels which display the second optical characteristic in the second image from the first optical characteristic to the second optical characteristic.

In this first method of the invention, the display may be a passive matrix display (as defined above) and step (b) may be effected on a line-by-line basis. In such a passive matrix method, step (b) may effected by applying to the electrodes of one set 0 or $\pm(2V/3)$ and to the electrodes of the other set $\pm(V/3)$, where V is the voltage difference necessary to drive a pixel from displaying the first optical characteristic to displaying the second optical characteristic.

In another aspect, this invention provides a (second or "balanced two step") method A method for driving a display of the present invention having a plurality of pixels, each capable of displaying either the first or the second optical characteristic at the viewing surface, from a first image to a second image. This method comprises:
(i) driving pixels having the first optical characteristic in the first image and the second optical characteristic in the second image to display the second optical characteristic; and
(ii) driving pixels having the second optical characteristic in the first image and the first optical characteristic in the second image to display the first optical characteristic.

In this second method of the invention, the display may be a passive matrix display (as defined above) and steps (a) and (b) may both be effected on a line-by-line basis. In such a passive matrix method, steps (a) and (b) may each be effected by applying to the electrodes of one set 0 or $\pm(2V/3)$ and to the electrodes of the other set $\pm(V/3)$, where V is the voltage difference necessary to drive a pixel from displaying the first optical characteristic to displaying the second optical characteristic or vice versa.

In another aspect, this invention provides an electrophoretic medium comprising a fluid and first, second and third types of particles dispersed in the fluid, wherein:
(i) the first and second types of particles bear charges of opposite polarities and have first and second optical characteristics differing from each other; and
(ii) the third type of particles has substantially the first optical characteristic and bears a charge of the same polarity as the second type of particles but have a lower zeta potential or electrophoretic mobility than the second type of particles.

In such an electrophoretic medium, the first and second optical characteristics may be differing colors, such as white and black colors. The third type of particles may have a larger average size than the first and second types of particles; for example, the third type of particles may be about 2 to about 50 times the size of the first or second types of particles.

BRIEF DESCRIPTION OF DRAWINGS

FIGS. 6A-6D illustrate the individual steps needed to effect the overall transition shown in FIG. 5B using the first method of the present invention and the potentials applied to the various electrodes shown in FIG. 5A during these steps.

FIGS. 7A-7E illustrate the individual steps needed to effect the overall transition shown in FIG. 5B using the second method of the present invention and the potentials applied to the various electrodes shown in FIG. 5A during these steps.

DETAILED DESCRIPTION

As indicated above, the present invention provides electrophoretic media, electrophoretic displays incorporating such media, and driving methods for use in such electrophoretic displays. The electrophoretic media of the present invention are especially useful for use in passive matrix displays.

Figure 1:
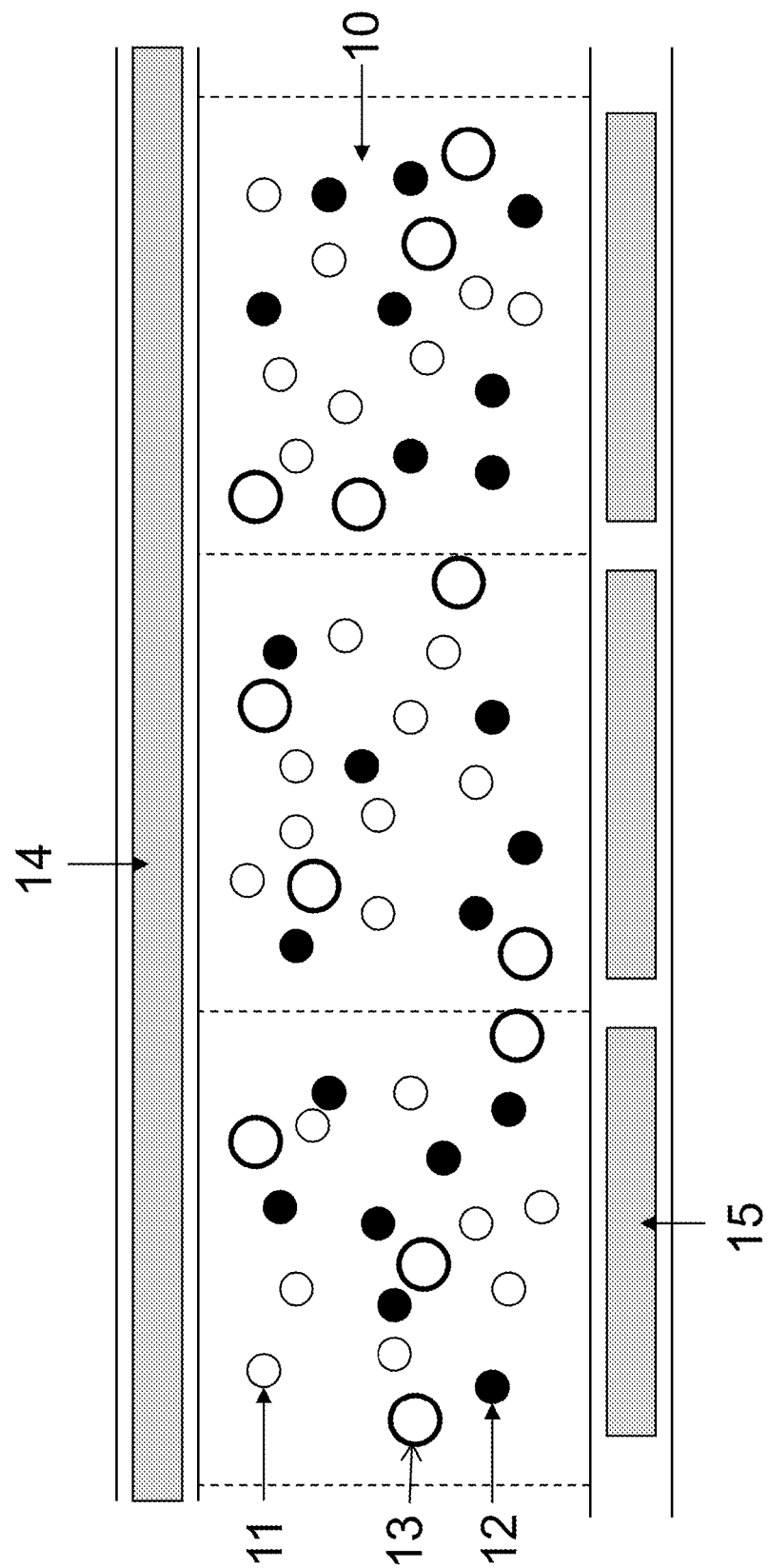
FIG. 1 is a schematic cross-section through an electrophoretic display of the present invention.

FIG. 1 is a schematic cross-section through an electrophoretic display of the present invention, this display comprising an electrophoretic medium (generally designated 10) disposed between two electrode layers 14 and 15. The display may be an active matrix display, in which case electrode layer 14 is a common, light-transmissive electrode (formed for example of indium tin oxide, ITO), extending across one entire surface of the display and the other electrode layer 15 is a layer of pixel electrodes (e.g., a thin-film-transistor (TFT) backplane). Alternatively, the display may be a passive matrix display, in which case one of the electrode layers comprises a set of elongate row electrodes and the other electrode layer comprises a set of column electrodes, with the row and column electrodes (typically) being perpendicular to each other. As already noted, the electrophoretic media of the present invention are particularly suitable for passive matrix driving.

For ease of comprehension, it will be assumed hereinafter that the upper surface of each display (as illustrated in the drawings) is the viewing surface through which a user views the display. It will be appreciated that optical characteristics may also be displayed on the lower (as illustrated) non-viewing surface and that such optical characteristics may be visible depending upon whether the electrode layer 15 is or is not light-transmissive.

The dotted lines in FIG. 1 indicate individual pixels of the display. If the display is an active matrix display, each pixel has a corresponding pixel electrode. If the display is a passive matrix display, a pixel is defined by the overlap between one row electrode and one column electrode. Other types of electrode addressing may be used provided the electrodes provide the necessary electric field across the electrophoretic medium.

The electrophoretic medium 10 comprises three types of charged particles dispersed in a fluid, typically a dielectric solvent or solvent mixture, the three types of particles will be referred to as a first type of particles 11, a second type of particles 12 and a third type of particles 13. The first and second types of particles have differing optical characteristics (typically contrasting colors) and carry charges of opposite polarities. The first type of particles may be white particles and the second type of particles may be black particles, as shown in FIG. 1, with one type being positively charged and the other type negatively charged.

The third type of particles 13 has substantially the same optical characteristic as the first type of particles, but carries a charge having the same polarity as that of the second type of particles, but at a lower intensity. The second type of particles may be regarded as having a threshold voltage in the sense that, as explained below, the second particles will not move adjacent the viewing electrode is the voltage between the electrodes falls below a certain value.

The term "threshold voltage" is defined for present purposes as the maximum voltage between the electrodes that may be applied for a period of time (typically not longer than 30 seconds, preferably not longer than 15 seconds), to particles, without causing them to appear at the viewing surface of a pixel, when the pixel is driven from a color state different from the color state of the particles. The threshold voltage may be either an inherent characteristic of the charged pigment particles or an additive-induced property. In the former case, the threshold is generated by certain attraction force between particles or between particles and certain substrate surfaces. A threshold may also be generated via interaction of two types of oppositely charged particles. In the latter case, to achieve a threshold voltage a threshold agent which induces or enhances the threshold characteristics of an electrophoretic medium may be added. The threshold agent may be any material which is soluble or dispersible in the solvent or solvent mixture of the electrophoretic fluid and carries or induces a charge opposite to that of the charged pigment particles. The threshold agent may be sensitive or insensitive to the change of applied voltage. The term "threshold agent" may broadly include dyes or pigments, electrolytes or polyelectrolytes, polymers, oligomers, surfactants, charge controlling agents and the like. Additional information relating to the threshold agent may be found in U.S. Pat. No. 8,115,729, the content of which is incorporated herein by reference in its entirety.

In order to facilitate passive matrix driving, the threshold voltage is at least one third of the voltage required to drive from the color state of the first type of particles to the color state of the second type of particles. More details are given below.

The third type of particles has a low level of charge intensity than the second type of particles although the two types of particles bear charges of the same polarity. The charge carried by the third type of particles may be less than about 50%, preferably about 5% to about 30%, of the charge carried by the second type of particles. The term "charge intensity", in the context of the present application, may be used interchangeably with "zeta potential" or with electrophoretic mobility. The charge polarities and levels of charge potential of the particles may be varied by the method described in U.S. Patent Application Publication No. 2014/0011913 and/or may be measured in terms of zeta potential. In one embodiment, the zeta potential is determined by Colloidal Dynamics AcoustoSizer IIM with a CSPU-100 signal processing unit, ESA EN# Attn flow through cell (K:127). The instrument constants, such as density of the solvent used in the sample, dielectric constant of the solvent, speed of sound in the solvent, viscosity of the solvent, all of which at the testing temperature (25° C.) are entered before testing. Pigment samples are dispersed in the solvent (which is usually a hydrocarbon fluid having less than 12 carbon atoms), and diluted to be 5-10% by weight. The sample also contains a charge control agent (Solsperse 17000, available from Lubrizol Corporation, a Berkshire Hathaway company; "Solsperse" is a Registered Trade Mark), with a weight ratio of 1:10 of the charge control agent to the particles. The mass of the diluted sample is determined and the sample is then loaded into the flow through cell for determination of the zeta potential. Methods and apparatus for the measurement of electrophoretic mobility are well known to those skilled in the technology of electrophoretic displays.

While the specific displays illustrated in the drawings use black and white particles as the first and second types of particles, it should be understood that the scope of the invention broadly encompasses two types of particles of any colors as long as they are visually contrasting.

White particles may be formed from an inorganic pigment, such as $TiO_2$, $ZrO_2$, ZnO, $Al_2O_3$, $Sb_2O_3$, $BaSO_4$, $PbSO_4$ or the like. Black particles may be formed from Cl pigment black 26 or 28 or the like (e.g., manganese ferrite black spinel or copper chromite black spinel) or carbon black. Particles which are non-white and non-black may be red, green, blue, magenta, cyan, yellow or any other desired colored, and may be formed from, for example, CI pigment PR 254, PR122, PR149, PG36, PG58, PG7, PB28, PB15:3, PY83, PY138, PY150, PY155 or PY20. Those are commonly used organic pigments described in color index handbooks, "New Pigment Application Technology" (CMC Publishing Co, Ltd, 1986) and "Printing Ink Technology" (CMC Publishing Co, Ltd, 1984). Specific examples include Clariant Hostapenn Red D3G 70-EDS, Hostaperm Pink E-EDS, PV fast red D3G, Hostaperm red D3G 70, Hostaperm Blue B2G-EDS, Hostaperm Yellow H4G-EDS, Novoperm Yellow HR-70-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow. The colored particles may also be inorganic pigments, such as red, green, blue and yellow. Examples may include, but are not limited to, CI pigment blue 28, CI pigment green 50 and CI pigment yellow 227.

The particles used may be primary particles without a polymer shell. Alternatively, each particle may comprise an insoluble core with a polymer shell. The core could be either an organic or inorganic pigment, and it may be a single core particle or an aggregate of multiple core particles. The particles may also be hollow particles.

The fluid in which the particles are dispersed may be clear and colorless. It preferably has a low viscosity and a dielectric constant in the range of about 2 to about 30, preferably about 2 to about 15 for high particle mobility. Examples of suitable dielectric solvent include hydrocarbons such as isoparaffin, decahydronaphthalene (DECALIN), 5-ethylidene-2-norbomene, fatty oils, paraffin oil, silicon fluids, aromatic hydrocarbons such as toluene, xylene, phenylxylylethane, dodecylbenzene or alkylnaphthalene, halogenated solvents such as perfluorodecalin, perfluorotoluene, perfluoroxylene, dichlorobenzotrifluoride, 3,4,5-trichlorobenzotrifluoride, chloropentafluorobenzene, dichlorononane or pentachlorobenzene, and perfluorinated solvents such as FC-43, FC-70 or FC-5060 from 3M Company, St. Paul Minn., low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, N.J., perfluoropolyalkylether such as Galden from Ausimont or Krytox Oils and Greases K-Fluid Series from DuPont, Del., polydimethylsiloxane based silicone oil from Dow-coming (DC-200).

The electrophoretic fluid in an electrophoretic display may be filled in display cells. The display cells may be microcells as described in U.S. Pat. No. 6,930,818, the content of which is incorporated herein by reference in its entirety. The display cells may also be other types of micro-containers, such as microcapsules, microchannels or equivalents, regardless of their shapes or sizes. All of these are within the scope of the present invention.

The three types of particles may have varying sizes; for example, one of the three types of particles may be larger than the other two types. Among the three types of particles, the third type having the lower charge intensity preferably has the larger size. For example, both the first and second types of particles may be relatively small and their sizes (tested through dynamic light scattering) may range from about 50 nm to about 800 nm, and more preferably from about 200 nm to about 700 nm, and in this example, the third type of particles which carries a lower charge intensity, preferably is about 2 to about 50 times, and more preferably about 2 to about 10 times, the sizes of the first and second types of particles.

The electrophoretic medium may contain additional additives to enhance performance of the display, such as additives to improve switching speed, bistability and reliability.

Figure 2:
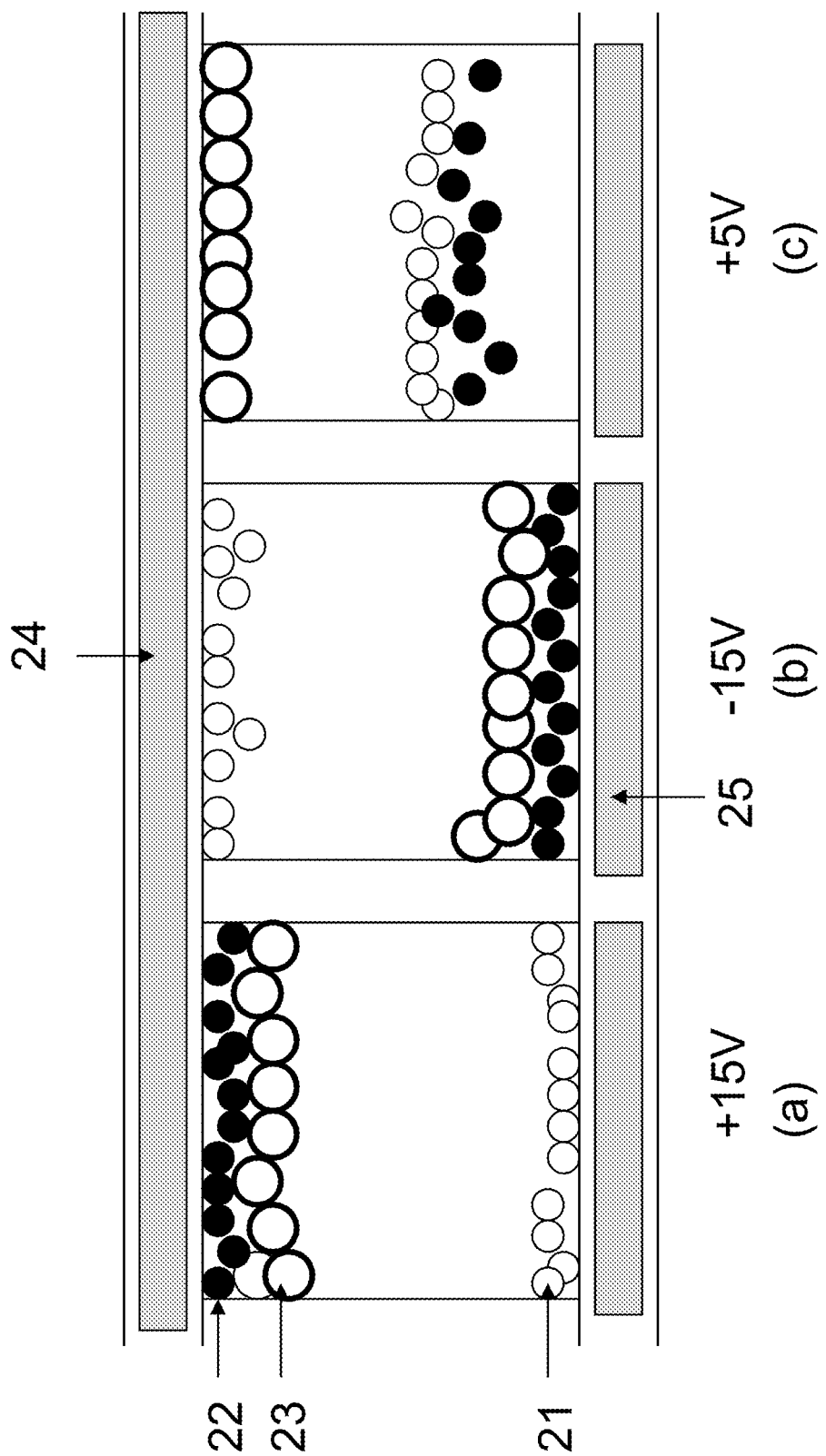
FIG. 2 is a schematic cross-section, similar to that of FIG. 1 but illustrating changes in particle positions effected during various steps of driving methods of the present invention.

FIG. 2 is a schematic cross-section illustrating changes in particle positions effected during various steps of driving methods of the present invention. In the electrophoretic medium shown in FIG. 2, the first type of particles 21 is white and negatively charged and the second type of particles 22 is black and positively charged. The third type of particles 23 is white and carries a positive charge, but at a lower intensity than that of the second type of particles. As a result, the black particles 22 move faster than the third type of particles 23 when high electric fields are applied because of the stronger charges the black particles carry. In FIG. 2, the "top" or "front" electrode" 24 lying adjacent the viewing surface is a common electrode and the "bottom electrode" 25 is a pixel electrode, in the case of active matrix driving. Alternatively, the "top electrode" associated with a pixel may be a row electrode and the bottom electrode may be a column electrode, or vice versa, in passive matrix driving.

In state (a) in FIG. 2, the pixel electrode 25 is set at +15V relative to the front electrode 24 (hereinafter, it will be assumed that the front electrode will be maintained at 0V, so in this case the common electrode is strongly negative relative to the pixel electrode) so the first type of particles 21 move adjacent the pixel electrode 25, while the black particles 22 and the third type of particles 23 move adjacent the front electrode 24. Because of their lower charge, the third type of particles 23 move towards the front electrode 24 more slowly than do the black particles 22, so that the black particles 22 lie immediately adjacent the front electrode 24 and mask the third type of particles 23, so that a black color is displayed at the viewing surface.

In state (b) in FIG. 2, the pixel electrode 25 is set at −15V relative to the front electrode 24 so the first type of particles 21 move adjacent the front electrode 24, while the black particles 22 and the third type of particles 23 move adjacent the pixel electrode 25, so that a white color is displayed at the viewing surface.

State (c) in FIG. 2 illustrates the manner in which the color of the third type of particles 23 is displayed at the viewing surface. The process starts from the white state (b). A low positive voltage (e.g., +5V) is applied to the pixel electrode 25 for a time period of sufficient length to cause the first type of particles 21 to move towards the pixel electrode 25 while the black particles 22 and the third type of particles 23 move towards the front electrode 24. However, when the first and second types of particles 21 and 22 meet intermediate the pixel and front electrodes as shown in state (c) in FIG. 2, they remain at the intermediate position because the electric field generated by the low driving voltage is not strong enough to overcome the attractive forces between them. As shown, the first and second types of particles stay intermediate the pixel and front electrodes in a mixed state. Accordingly, the color of the third type of particles (white) is visible at the viewing surface. Adjacent the non-viewing surface, the first and second types of particles are mixed, resulting in an intermediate color (gray) being displayed, assuming the pixel electrode 25 is light-transmissive.

Figure 3:
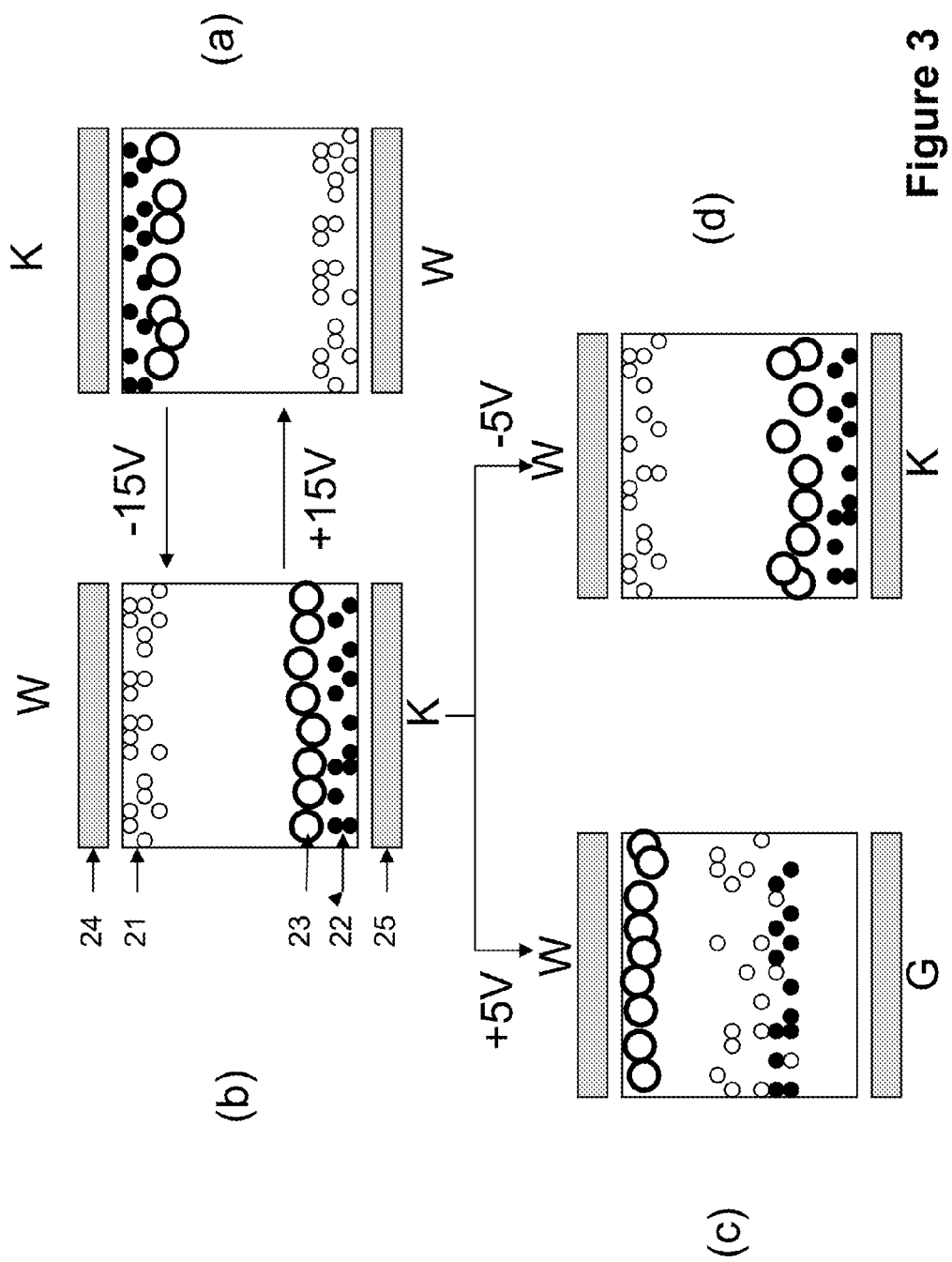
FIG. 3 is a schematic cross-section similar to that of FIG. 2 but illustrating the effects of applying various electric fields to various states illustrated in FIG. 2.

The upper part of FIG. 3 repeats states (a) and (b) from FIG. 2 and illustrates the transitions between them using driving voltages of ±15V. FIG. 3 also shows that application of a +5V driving voltage to a pixel in state (b) transforms it to state (c), in which the color of the third particles 23 is displayed at the viewing surface. However, since the optical characteristic (color) of the third particles 23 is essentially the same as that of the first particles 21, the transition from state (b) to state (c) causes no visible change in the appearance of the pixel.

Finally, FIG. 3 shows that when a driving voltage of −5V is applied to the pixel in state (b), none of the particles move, since the effect of the −5V driving voltage is to drive the first particles 21 adjacent the front electrode 24 and the first and third particles adjacent the pixel electrodes 25. Thus, FIG. 3 shows that once the pixel has been driven by means of a −15V driving voltage from black state (a) to white state (b), no further visible change is brought about by later application of either a +5V or a −5V driving voltage. It is this characteristic of the electrophoretic of the present invention which renders them especially suitable for passive matrix driving.

Figure 4:
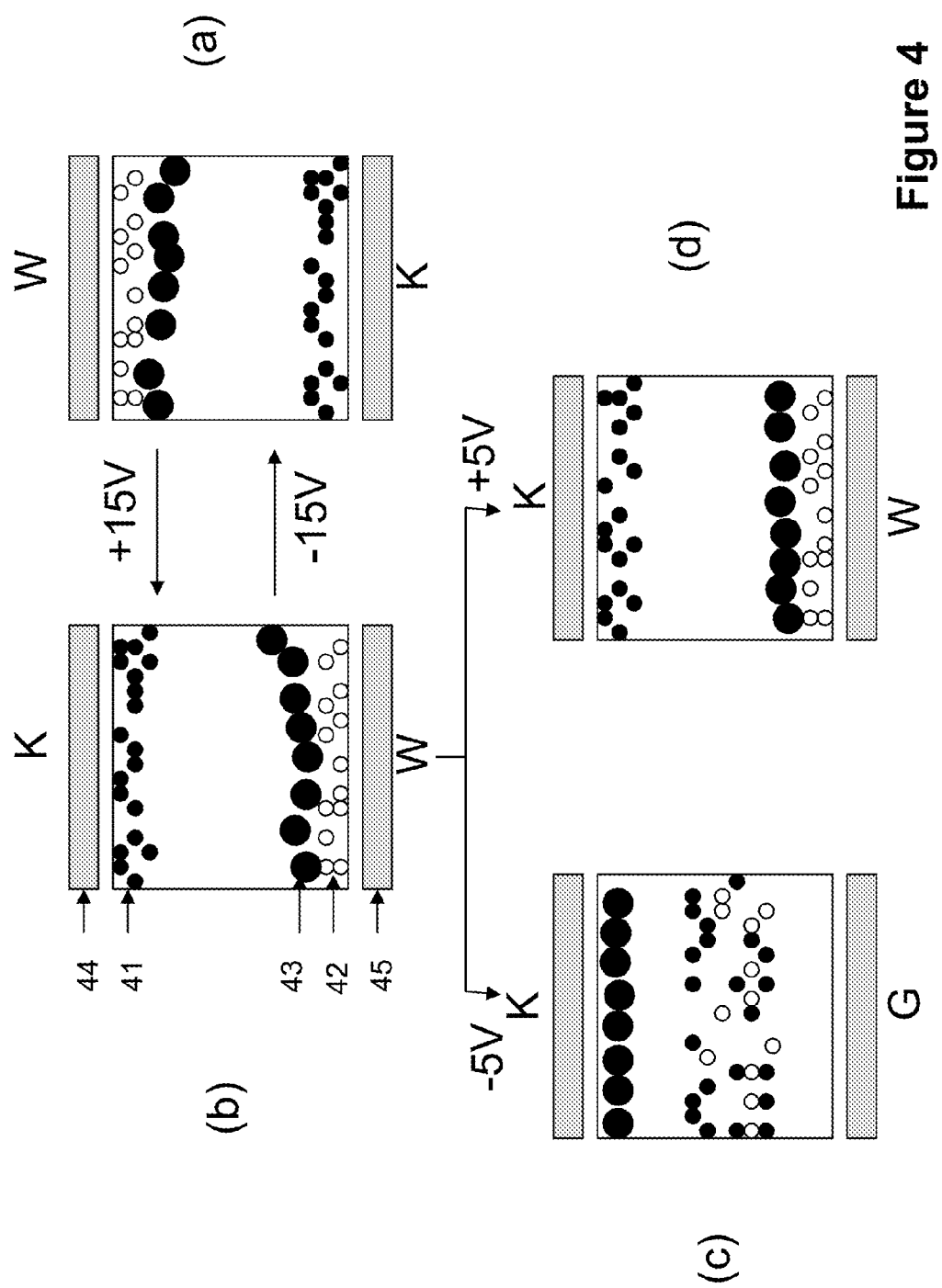
FIG. 4 is a schematic cross-section similar to that of FIG. 3 but illustrating an alternative electrophoretic display in which the colors of the various particles are reversed compared to the display of FIG. 3.

FIG. 4 is exactly analogous to FIG. 3 but illustrates an electrophoretic display in which the first type of particles 41 is black and positively charged and the second type of particles 42 is white and negatively charged. The third type of particles 43 is black and negatively charged. The white particles (i.e., the second type) have a threshold voltage, which is one third of the voltage required to drive from the black state to the white state.

It is believed that the transitions shown in FIG. 4 will readily be apparent to those skilled in electrophoretic displays in view of the preceding explanation of the transitions shown in FIG. 3, and thus the transitions shown in FIG. 4 may be summarized as follows. When to a pixel in state (a) shown in FIG. 4 (this is of course the white state of the pixel) a driving voltage of +15V is applied, the first type of (black) particles 41 move adjacent the front electrode 44 and the white particles 42 move adjacent the pixel electrode 45, so that a black color is displayed at the viewing side. The third type of particles 43 move with the white particles 42, but more slowly than the white particles. Applying a driving voltage of −15V to the pixel in state (b) reverses these particle movements and restores the white state (a).

FIG. 4 also illustrates the effect of applying ±5V driving voltages to the pixel in state (b). As shown in FIG. 4, and as should readily be apparent from the foregoing explanation of FIG. 3, application of a −5V driving voltage to the pixel in state (b) results in state (c), in which the third type of particles 43 lie adjacent the front electrode 44 and an aggregated mixture of the first and second types of particles 41 and 42 lie intermediate the front and pixel electrodes 44 and 45. Since the third type of particles are black, a black color is displayed at the viewing surface, while a gray color is visible at the non-viewing surface if the pixel electrode 45 is light-transmissive. Similarly, application of a +5V driving voltage to the pixel in state (b) produces essentially no particle movement and the pixel remains in the same state as shown at (d) in FIG. 4. Thus, from FIG. 4 is can be concluded that once the pixel has been driven from the white state (a) to the black state (b) using a +15V driving voltage, subsequent application of ±5V driving voltages to the pixel produces no further visible change in the appearance of the pixel.

More generally, the foregoing consideration of FIGS. 3 and 4 shows that, in the electrophoretic media of the present invention, once a pixel has been driven from the state in which the optical characteristic of the second type of particles is displayed (state (a)) to the state in which the optical characteristic of the first type of particles is displayed (state (b)) using a driving voltage E (±15V in FIGS. 3 and 4), subsequent application to the pixel of driving voltages of (E/3) (±5V in FIGS. 3 and 4 will produce no further visible change in the appearance of the pixel (states (c) and (d)). It is this immunity of the pixel displaying the optical characteristic of the first type of particles which renders the electrophoretic media of the present invention especially suitable for passive matrix driving, although active matrix or other driving techniques may be used if desired.

Figure 5A:
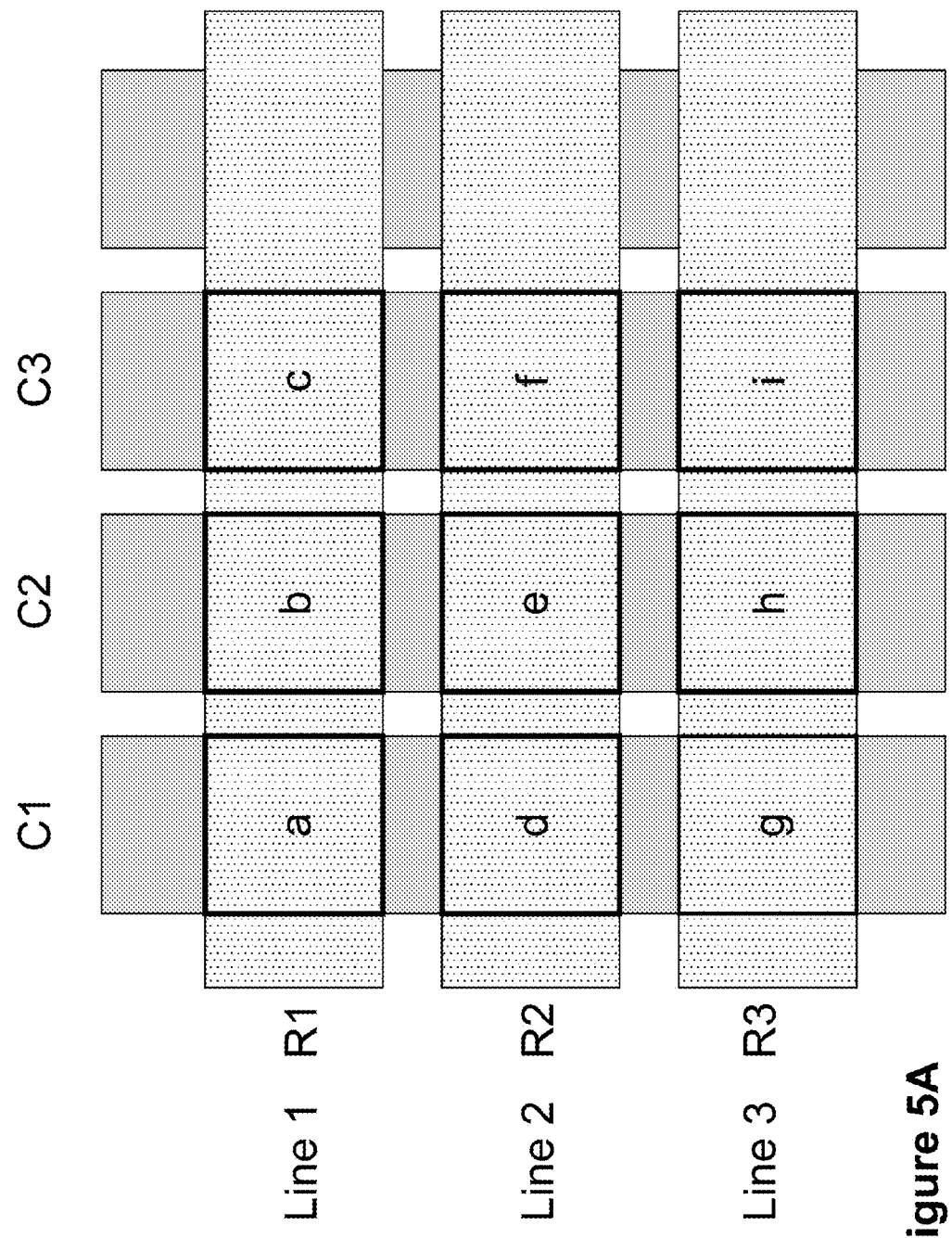
FIG. 5A illustrate the arrangement of electrodes in a passive matrix driving system.

FIG. 5A depicts schematically the configuration of electrodes in a typical passive matrix display. As shown, a set of column electrodes (C1-C3) are perpendicular to a set of row electrodes (R1-R3); in practice, there would normally be a much larger number of both column and row electrodes and the numbers of electrodes in each set need not be equal, since, for example, a display with an aspect ratio of 4:3 might have 600 row electrodes and 800 column electrodes. As illustrated in FIG. 5A, the column electrodes underlie the row electrodes. Each pixel of the display is defined by the overlap between one row electrode and one column electrode, and therefore for each pixel as illustrated, the row electrode would be the front electrode and the column electrode would be the bottom electrode. The nine pixels shown are designated (a)-(i) for illustrative purposes. Pixels (a)-(c) are on line 1; pixels (d)-(f) on line 2; and pixels (g)-(i) on line 3.

Figure 5B:
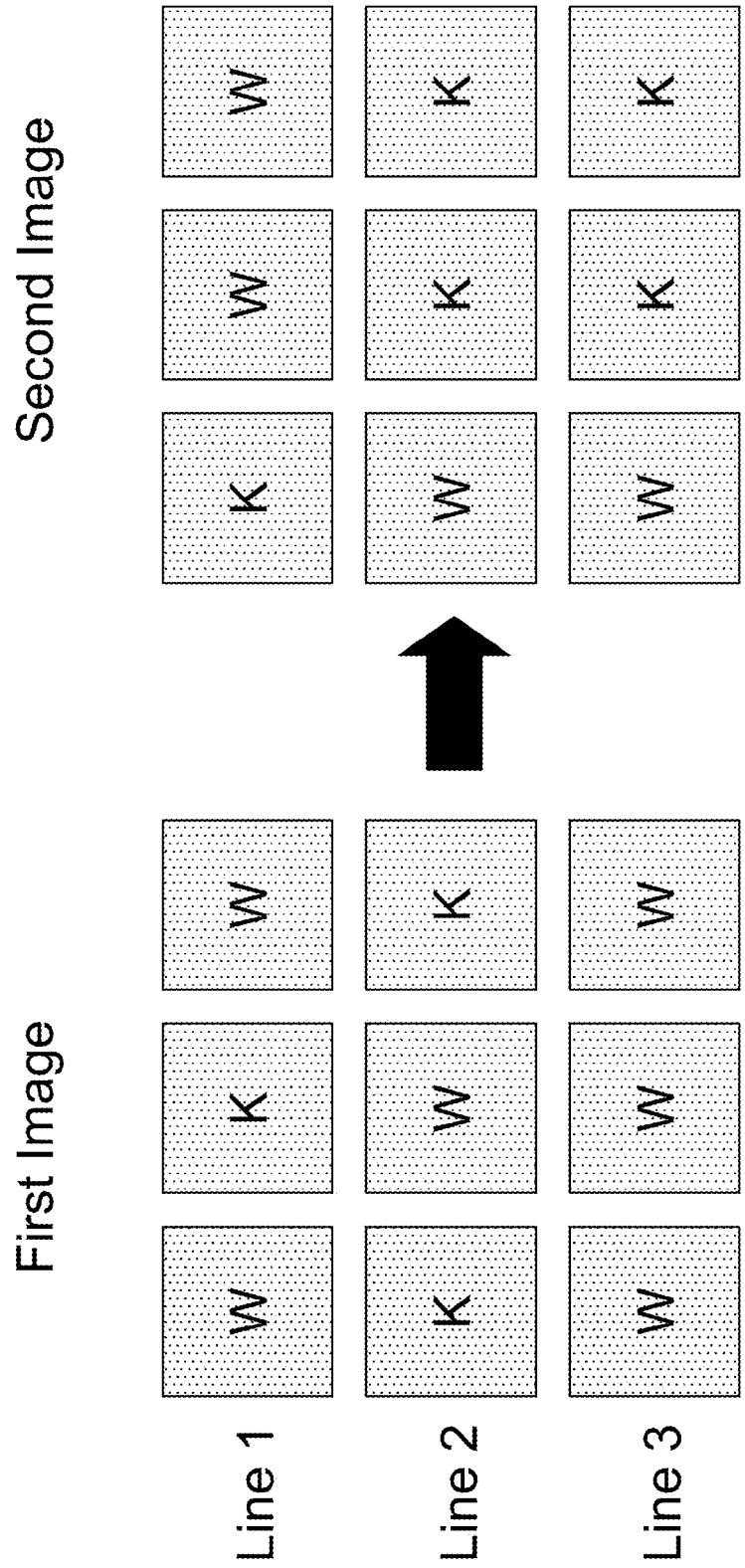
FIG. 5B illustrates a transition from a first image to a second image in the passive matrix driving system of FIG. 5A.

FIG. 5B illustrates two sample images used in the discussion of the methods of the present invention below. In a first image, pixels (a)-(i) are W (white), K (black), W, K, W, K, W, W and W, respectively. In a second image, pixels (a)-(i) are K, W, W, W, K, K, W, K and K, respectively. Methods of the present invention for driving the first image to the second image are described below.

FIGS. 6A-6D illustrate the steps needed to drive the electrophoretic display of FIG. 3 from the first image to the second image shown in FIG. 5B using the first, via first method of the present invention. In Step 1, illustrated in FIG. 6A, all pixels are driven to display the color of the first type of particles (white) regardless of their state in the first image. To accomplish this, all column electrodes C1-C3 are set to −10V and all row electrodes R1-R3 are set to of +5V. As a result, all pixels experience a driving voltage of −15V and therefore switch to the state in which the color of the first type of particles is displayed (state (b) in FIG. 3).

In Step 2 (FIG. 6B), only line 1 is driven to switch to black any pixels required to be black in the second image. As illustrated, pixel (a) is the only pixel that needs to be driven to the black state (see FIG. 5B). To accomplish this, column electrodes C1-C3 are set to +10V, 0 V and 0 V, respectively, and row electrodes R1-R3 are set to −5 V, +5V and +5V, respectively. As a result, pixel (a) experiences a driving voltage of +15V, and therefore switches to the black state (see FIG. 3, transition from state (b) to state (a)). The remaining pixels experience driving voltages of +5V or −5V and thus remain white (see FIG. 3, transitions from state (b) to states (c) and (d) respectively).

In Step 3 (FIG. 6C), only line 2 is driven to switch to black any pixels required to be black in the second image. In this example, pixels (e) and (f) are the only pixels that need to be driven to the black state (see FIG. 5B). To accomplish this, column electrodes C1-C3 are set to 0V, +10V and +10V, respectively and row electrodes R1-R3 are set to +5V, −5V and +5V, respectively. As a result, both pixels (e) and (f) experience a driving voltage of +15V and therefore switch from white to black and the remaining pixels experience a driving voltage of either +5V or −5V and thus remain white (cf. description of Step 2 in the preceding paragraph).

In the final Step 4 (FIG. 6D), only line 3 is driven to switch to black any pixels required to be black in the second image. In this example, pixels (h) and (i) are the only pixels that need to be driven to the black state (see FIG. 5B). To accomplish this, column electrodes C1-C3 are set to 0V, +10V and +10V, respectively and row electrodes R1-R3 are set to +5V, +5V and −5V, respectively. As a result, both pixels (h) and (i) experience a driving voltage of +15V and therefore switch from white to black and the remaining pixels experience a driving voltage of either +5V or −5V and therefore remain white (cf. description of Steps 2 and 3 in the two preceding paragraphs).

Thus, the first driving method of the present invention, as shown in FIGS. 6A-6D comprises an initial step of driving all pixels to the color of the first type of particles, and thereafter driving, line by line, until all lines have been driven, the pixels required to be in a different color states in the second image. While black and white color states have been used to exemplify the method, it will be understood that the present method can be applied to any two color states as long as the two color states are visually distinguishable.

FIGS. 7A-7E illustrate the steps of the second driving method of the present invention. In this second method, the pixels are driven line by line, and in the illustrated system, black pixels are driven to white (i.e., pixels displaying the color of the second type of particles are driven to the color of the first type of particles) before white pixels are driven to black.

In Step 1, illustrated in FIG. 7A, only line 1 is driven to switch any black pixels to white if the pixels are required to be white in the second image. As illustrated, pixel (b) in line 1 is the only pixel that needs to be driven from black to white (see FIG. 5B). To accomplish this, column electrodes C1-C3 are set to 0V, −10V and 0V, respectively and row electrodes R1-R3 are set to +5V, −5V and −5V, respectively. As a result, pixel (b) experiences a driving voltage of −15V, and therefore switches to the white state (see FIG. 3A, transition from state (b) to state (a)). The remaining pixels experience driving voltages of +5V or −5V and thus remain unchanged.

In Step 2 (FIG. 7B), only line 2 is driven to switch any black pixels which are required to be white in the second image. In this example, pixel (d) is the only pixel that needs to be driven from black to white (see FIG. 5B). To accomplish this, column electrodes C1-C3 are set to −10V, 0V and 0V, respectively and row electrodes R1-R3 are set to −5V, +5V and −5V, respectively. Pixel (d) experiences a driving voltage of −15V and switches from black to white, while the remaining pixels experience driving voltages of either +5V or −5V and remain unchanged.

There are no pixels at line 3 that need to be driven from black to white (see FIG. 5B). Hence, this step can be omitted in the method as illustrated, although it should be noted that the second method will typically require 2N steps where N is in the number of row electrodes in the passive matrix.

In the next step, illustrated in FIG. 7C, only line 1 is driven to switch any white pixels to black if the pixels are required to be black in the second image. In this example, pixel (a) is the only pixel that needs to be driven to the black state (see FIG. 5B). To accomplish this, column electrodes C1-C3 are set to +10V, 0V and 0V, respectively and row electrodes R1-R3 are set to −5V, +5V and +5V, respectively. Pixel (a) experiences a driving voltage of +15V and therefore switches from white to black, while the remaining pixels experience driving voltages of either +5V or −5V and therefore remain unchanged.

In the next step, illustrated in FIG. 7D, only line 2 is driven to switch any white pixels to black if the pixels are required to be black in the second image. In this example, pixel (e) is the only pixel that needs to be driven to the black state (see FIG. 5B). To accomplish this, column electrodes C1-C3 are set to 0V, +10V and 0V, respectively and row electrodes R1-R3 are set to +5V, −5V and +5V, respectively. Pixel (e) experiences a driving voltage of +15V and therefore switches from white to black, while the remaining pixels experience driving voltages of either +5V or −5V and remain unchanged.

In the final step, as illustrated in FIG. 7E, only line 3 is driven to switch any white pixels to black if the pixels are required to be black in the second image. In this example, pixels (h) and (i) are the only pixels that need to be driven to the black state (see FIG. 5B). To accomplish this, column electrodes C1-C3 are set to 0V, +10V and +10V, respectively and row electrodes R1-R3 are set to +5V, +5V and −5V, respectively. Pixels (h) and (i) experience a driving voltage of +15V and therefore switch from white to black and the remaining pixels experience a driving voltage of either +5V or −5V and remain unchanged.

Thus, in the second method of the present invention, driving, as shown, is carried out line by line until the last line of the second pass when all pixels have been driven to the colors needed in the second image.

From the foregoing, it will be seen that the present invention can provide a electrophoretic medium, electrophoretic display and driving methods which are well adapted for use with passive matrix drive schemes.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. An electrophoretic display having a viewing surface and comprising an electrophoretic medium and means for applying an electric field to the electrophoretic medium, the electrophoretic medium comprising a fluid and first, second and third types of particles dispersed in the fluid, wherein:
   (i) the first and second types of particles bear charges of opposite polarities and have first and second optical characteristics differing from each other;
   (ii) the third type of particles has substantially the first optical characteristic and bears a charge of the same polarity as the second type of particles but have a lower zeta potential or electrophoretic mobility than the second type of particles; and
   (iii) when the first optical characteristic is displayed at the viewing surface, application for a time T of an electric field E of a polarity which drives the second type of particles towards the viewing surface will cause the second optical characteristic to be displayed at the viewing surface, but application for a time T of an electric field E/3 of the same polarity will cause the first optical characteristic to remain displayed at the viewing surface.

2. An electrophoretic display according to claim 1 wherein the first and second optical characteristics are differing colors.

3. An electrophoretic display according to claim 2 wherein the first and second optical characteristics are white and black colors.

4. An electrophoretic display according to claim 3 wherein the first type of particles is white and negatively charged, the second type of particles is black and positively charged, and the third type of particles is white and positively charged.

5. An electrophoretic display according to claim 3 wherein the first type of particles is black and positively charged, the second type of particles is white and negatively charged, the third type of particles is black and negatively charged.

6. An electrophoretic display according to claim 3 wherein the first type of particles is white and positively charged, the second type of particles is black and negatively charged, and the third type of particles is white and negatively charged.

7. An electrophoretic display according to claim 3 wherein the first type of particles is black and negatively charged, the second type of particles is white and positively charged, and the third type of particles is black and positively charged.

8. An electrophoretic display according to claim 1 wherein the third type of particles has a larger average size than the first and second types of particles.

9. An electrophoretic display according to claim 8 wherein the third type of particles are about 2 to about 50 times the size of the first or second types of particles.

10. An electrophoretic display according to claim 1 wherein the means for applying an electric field comprises a first set of elongate electrodes disposed adjacent the viewing surface and a second set of elongate electrodes disposed on the opposed side of the electrophoretic medium from the viewing surface, the first and second sets of elongate electrodes being arranged with their long axes at an angle to each other so that a plurality of pixels are formed, each pixel being defined by the overlap of one electrode of the first set with one electrode of the second set, thereby forming a passive matrix driving system.

11. A method for driving a display according to claim 1 having a plurality of pixels, each capable of displaying either the first or the second optical characteristic at the viewing surface, from a first image to a second image, which method comprises:
(a) driving all pixels of the display to display the first optical characteristic; and
(b) driving the pixels which display the second optical characteristic in the second image from the first optical characteristic to the second optical characteristic.

12. A method according to claim 11 wherein the means for applying an electric field comprises a first set of elongate electrodes disposed adjacent the viewing surface and a second set of elongate electrodes disposed on the opposed side of the electrophoretic medium from the viewing surface, the first and second sets of elongate electrodes being arranged with their long axes at an angle to each other so that a plurality of pixels are formed, each pixel being defined by the overlap of one electrode of the first set with one electrode of the second set, thereby forming a passive matrix driving system, and step (b) is effected on a line-by-line basis.

13. A method according to claim 12 wherein step (b) is effected by applying to the electrodes of one set 0 or $\pm(2V/3)$ and to the electrodes of the other set $\pm(V/3)$, where V is the voltage difference necessary to drive a pixel from displaying the first optical characteristic to displaying the second optical characteristic.

14. A method for driving a display according to claim 1 having a plurality of pixels, each capable of displaying either the first or the second optical characteristic at the viewing surface, from a first image to a second image, which method comprises:
(a) driving pixels having the first optical characteristic in the first image and the second optical characteristic in the second image to display the second optical characteristic; and
(b) driving pixels having the second optical characteristic in the first image and the first optical characteristic in the second image to display the first optical characteristic.

15. A method according to claim 14 wherein the means for applying an electric field comprises a first set of elongate electrodes disposed adjacent the viewing surface and a second set of elongate electrodes disposed on the opposed side of the electrophoretic medium from the viewing surface, the first and second sets of elongate electrodes being arranged with their long axes at an angle to each other so that a plurality of pixels are formed, each pixel being defined by the overlap of one electrode of the first set with one electrode of the second set, thereby forming a passive matrix driving system, and steps (a) and (b) are both effected on a line-by-line basis.

16. A method according to claim 15 wherein steps (a) and (b) are each effected by applying to the electrodes of one set 0 or $\pm(2V/3)$ and to the electrodes of the other set $\pm(V/3)$, where V is the voltage difference necessary to drive a pixel from displaying the first optical characteristic to displaying the second optical characteristic or vice versa.

\* \* \* \* \*